US012789357B2

(12) United States Patent
Becker et al.

(10) Patent No.: US 12,789,357 B2
(45) Date of Patent: Nov. 10, 2026

(54) SYSTEMS AND METHODS FOR IMPLEMENTING BIOLOGICAL MUSCULATURE AESTHETICS

(71) Applicant: DISNEY ENTERPRISES, INC., Burbank, CA (US)

(72) Inventors: Jonathan Becker, Los Angeles, CA (US); Richard-Alexandre Peloquin, Glendale, CA (US); Clara Bercovici, Los Angeles, CA (US); Maeis Heshmati, Tujunga, CA (US); Bryan S. Tye, Canyon Country, CA (US); Franklin T. Batino, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 705 days.

(21) Appl. No.: 18/127,984

(22) Filed: Mar. 29, 2023

(65) Prior Publication Data

US 2024/0083017 A1 Mar. 14, 2024

Related U.S. Application Data

(60) Provisional application No. 63/404,680, filed on Sep. 8, 2022.

(51) Int. Cl.
*A61H 1/02* (2006.01)
*B25J 9/00* (2006.01)

(52) U.S. Cl.
CPC ..... *B25J 9/0006* (2013.01); *A61H 2201/1253* (2013.01); *A61H 2201/1611* (2013.01);
(Continued)

(58) Field of Classification Search
CPC ........ B25J 9/0006; B25J 11/003; A63J 7/005; A63H 2201/1253; A61H 2201/1626;
(Continued)

(56) References Cited

U.S. PATENT DOCUMENTS 3,358,678 A * 12/1967 Kultsar .................. B25J 9/0006 2/457
5,282,460 A * 2/1994 Boldt ....................... B25J 9/146 403/119
(Continued)

FOREIGN PATENT DOCUMENTS

CN 105751204 * 7/2016

*Primary Examiner* — Kristen C Hayes
(74) *Attorney, Agent, or Firm* — Dorsey & Whitney LLP

(57) ABSTRACT

An exoskeleton to support and move a large character costume and to transfer weight of the costume away from a performer's body. The exoskeleton includes a spine including an elongated and rigid vertical member and also includes a waist ring configured to extend about a waist of a performer using the exoskeleton in a spaced apart manner. A lower end of the spine is attached to a rear center portion of the waist ring. The exoskeleton includes a pair of leg assemblies each pivotally coupled on opposite sides of the waist ring. Each of the leg assemblies is spaced apart from a leg of the performer and extends below a foot of the performer, whereby weight is transmitted to a support surface. Each of the leg assemblies may include at least one passive assist mechanism configured to assist the performer in moving the exoskeleton with bipedal locomotion.

13 Claims, 21 Drawing Sheets

(52) U.S. Cl.
CPC ................ *A61H 2201/1616* (2013.01); *A61H 2201/1626* (2013.01); *A61H 2201/163* (2013.01); *A61H 2201/1638* (2013.01); *A61H 2201/1645* (2013.01)

(58) Field of Classification Search
CPC .... A61H 2201/1638; A61H 2201/1616; A61H 2201/1611; A61H 2201/1238; A61H 2201/1609; A61H 2201/1635
See application file for complete search history.

(56) References Cited

U.S. PATENT DOCUMENTS

| | | | | |
|---|---|---|---|---|
| 7,238,079 | B2 * | 7/2007 | Madhani | B62D 57/032 446/377 |
| 2015/0196403 | A1 * | 7/2015 | Kim | A61F 2/70 623/24 |
| 2015/0366694 | A1 * | 12/2015 | Bujold | A61F 5/0102 602/19 |
| 2019/0289934 | A1 * | 9/2019 | Lee | A61H 3/00 |
| 2019/0344456 | A1 * | 11/2019 | Baptista | B25J 9/0006 |
| 2021/0030613 | A1 * | 2/2021 | Kodama | G06F 3/011 |
| 2026/0102306 | A1 * | 4/2026 | Pinnock | A61H 1/024 |

* cited by examiner

SYSTEMS AND METHODS FOR IMPLEMENTING BIOLOGICAL MUSCULATURE AESTHETICS

CROSS-REFERENCE TO RELATED APPLICATION

This application claims priority to U.S. Provisional Pat. Appl. No. 63/404,680, filed on Sep. 8, 2022, which is incorporated by reference herein as if set forth in full.

BACKGROUND

1. Field of the Description

The present invention relates, in general, to systems and methods for implementing very large, costumed characters (e.g., costumes representing characters that are significantly larger than the human actor or performer). More particularly, the present description relates to systems and methods for designing and fabricating oversized character costumes that implement biological musculature aesthetics and distribute costume weight into the ground and away from a performer's vulnerable joints.

2. Relevant Background

There are many situations where it is desirable to provide costumed characters to entertain nearby crowds and audiences. For example, theme and amusement parks often have human performers in costumes mingling with crowds and providing shows and parades, with the costumes representing a wide variety of characters including those from television shows and movies that may be live action or be animated. Sporting events often include mascots and other performers wearing costumes to provide unique human-like (e.g., bipedal with moving hands) characters.

The design and fabrication of character costumes present a variety of challenges including ergonomic challenges. These challenges are amplified when the costumes grow larger to match the scale of characters that are much larger than the human performer wearing and operating the costume. The challenges or problems include: (a) the weight of the costume; (b) where on a performer's body that the costume weight is felt or carried; and (c) limited ranges of motion. These problems often negatively affect a performer's comfort and sense of balance while wearing the costume, and this often limits performance durations to assure performer safety. To address these concerns, character costumes are often scaled down from the expected larger sizes or are simply not brought to life by costumed characters.

Some have proposed the use of exoskeletons for use in costumed characters, but exoskeletons presently are not designed to meet the challenges of a very large character's costume. Most exoskeletons are designed to augment human abilities for utilitarian and task-oriented purposes. As a result of this design goal, many are powered and attach to a human wearer's body. They are controlled to sense the wearer's gestures and motion and then amplify the sensed motions through powered actuators that drive the exoskeleton. In this manner, people can perform various tasks that would be difficult or impossible to do without augmentation.

These prior exoskeletons are ill-suited for entertainment and costuming purposes because their structure and function do not support biologically based character aesthetics. Their design purposes of lifting heavy loads and performing repetitive difficult tasks are not needed for typical character costumes where subtle in-character motions and gentle, safe interactions with humans and objects is desired. Simply "skinning" an existing exoskeleton to try to form a costumed character would also be problematic because the aesthetic additions of muscle, fat, and elastomer skins often would interfere with the utilitarian mechanics and the end product would typically fail to replicate the appearance of a biological character.

Another challenge in creating a large costumed character is to achieve the look and feel of a biologically accurate character or being. In traditional costuming, reticulated foam, microbeads, and/or fabric are used to implement muscle appearance. These foam pieces are shaved, shaped, and patterned by hand, which is a very time-consuming process. These processes are labor intensive and rely heavily on the availability of particular skilled artisans to create and maintain the structures. Even then, it is challenging for artists to create visually accurate costumes that dynamically change appearance as the performer moves in a performance in a manner that is aesthetically consistent with amplified body types and caricatures such as found in animation, super-hero costumes, mascot costumes, and the like.

SUMMARY

To address these large costume challenges, the inventors designed a large character costume system or simply "costume" with a passive exoskeleton that acts as a skeletal intermediary between the human performer and the skin or outer layer of the costume. The exoskeleton is configured to perform the following two main tasks: (a) redirects the weight of the costume down into the ground (or other support surface) below the performer instead of into the performer's back or shoulders; and (b) gives passive assist (e.g., pneumatic, elastic, and similar non-powered or motorized assist or lift) in key joint areas to aid in moving, rotating, and/or lifting appendages, which may include an outer shell extending about components of the exoskeleton as well the outer layer or skin overing such shells. The resulting costume provided a better experience for those observing a performer moving about in the costume, including seeing their favorite large characters come to life, and for the performers using the costumes, including allowing them to give good shows or character performances including locomotion in a safer manner with increase time onstage or among visitors to a theme park, a sports stadium, or other facility.

Further, the inventors developed a library of mesh elements (or lattice structures) for use in forming differing muscle, fat, and other under-skin biological tissues or components (which may be labeled "bio elements" herein) to achieve desired biological musculature aesthetics. In this regard, the inventors recognized that a need exists for methods that are faster and repeatable, going straight from software to a 3D printing machines (e.g., selective laser sintering or SLS machine) for manufacture. Furthermore, the physics modeling of muscle movement as well as the lattice structures chosen to allow for more desired stretch under tension as well as control of a muscles intended shape under compression. In this regard, a library of printable muscle networks was designed and defined via digital files and also fabricated (e.g., via 3D printing). Each muscle network or "bio element" is configured in use to deform in a particular fashion in response to applied stress, strain, and twisting created by an exoskeleton. To achieve a particular dynamic appearance during motion of the costume, a costume designer or fabricator would select one or multiple muscle networks from the library and shape them to fill out the character bulk, attaching them to actuated portions of the exoskeleton. By utilizing muscle physics simulations to determine the desired look of a more under tension or compression, the aesthetic response of the muscle networks can thus be predicted in a way that has not been possible. Character skin is attached so as to be actuated by the skeleton and the muscle network to achieve a new kind of dynamic appearance for large characters.

More particularly, an exoskeleton is described for use in a large character costume to support and move an outer skin layer and to transfer weight away from a performer's body to the ground or other support surface. The exoskeleton includes a spine with an elongated and rigid vertical member and also includes a waist ring arcuate in shape configured to extend about a waist of a performer using the exoskeleton in a spaced apart manner. In some embodiments, a lower end of the spine is attached to a rear center portion of the waist ring. The exoskeleton further includes a pair of leg assemblies each pivotally coupled on opposite sides of the waist ring. Each of the leg assemblies is configured to be spaced apart from a leg of the performer, and each of the leg assemblies is further configured to extend below a foot of the performer, whereby weight of the outer skin layer and the exoskeleton are transmitted to a support surface under the leg assemblies. Each of the leg assemblies may include at least one passive assist mechanism configured to assist the performer in moving the exoskeleton with bipedal locomotion.

In some embodiments, the exoskeleton may further include a neck physical assist mechanism including a collar that is arcuate in shape, configured to extend at least partially about a neck of the performer, and attached to an upper end of the spine. The neck physical assist mechanism further may include a mounting element (e.g., a helmet suited for positioning above a performer's head with mounting components on an upper surface) for receiving and attaching to a head of the large character costume. Additionally, a passive assist assembly is disposed between the mounting element and the collar that is configured to assist the performer in moving the head relative to the upper end of the spine. In some useful implementations, the passive assist assembly includes a plurality of spaced-apart, arcuate-shaped neck support elements and two or more spring members (e.g., metal springs, plastic, or rubber (or other elastic or resilient material) hoops, and/or the like) disposed between adjacent pairs of the neck support elements and between the collar and a lower one of the neck support members.

In the same or other embodiments, the exoskeleton includes a shoulder assembly pivotally coupled to an upper end of the spine and a shoulder passive assist mechanism configured for assisting in pivoting the shoulder assembly relative to the upper end of the spine. In such cases, the exoskeleton may also include an arm member pivotally coupled via a shoulder joint to portion of the shoulder assembly distal to the spine and a passive lift assist mechanism configured for assisting the performer in lifting the arm member about the shoulder joint. Still further, the exoskeleton may include a manipulable hand coupled to the arm member at an end opposite the shoulder joint and a hand drive mechanism operable by the performer's hand to rotate the hand relative to the arm member or to move one or more fingers of the manipulable hand. Then, in implementation, the hand drive mechanism may be slidably supported on the arm member to allow a location of the hand drive mechanism in the exoskeleton to be linearly adjusted relative to the arm member to account for a size of the performer.

DETAILED DESCRIPTION

Embodiments described herein are directed toward systems and methods for providing costumed characters with accurate and/or lifelike biological musculature aesthetics and movements. In brief, the costume-character system is configured with a unique exoskeleton that is adapted specifically to assist a human performer to have locomotion and arm and head movements that appear more natural even in a costume that is scaled upward to represent a very large character (e.g., one that is 50 to 300 percent the size of the performer wearing the costume). This is achieved without, in many cases, powered components such that the costumed-character system is "passive" and without the weight being unduly placed on the performer as most of the costume's weight is transferred to the ground (or to surface on which the character is walking). Additionally, the costumed-character system is designed and fabricated to include one-to-many elements that simulate the muscles, fat, and other tissues underlying the character's outer skin or layer and typically mounted on the outer surfaces of the shells of the exoskeleton, and these elements may be labeled "bio elements" or a similar term and be selected from a library of definitions that can be used to 3D print or otherwise efficiently manufacture these components in an efficient manner to provide biological musculature aesthetics to the costumed-character system.

Figure 1:
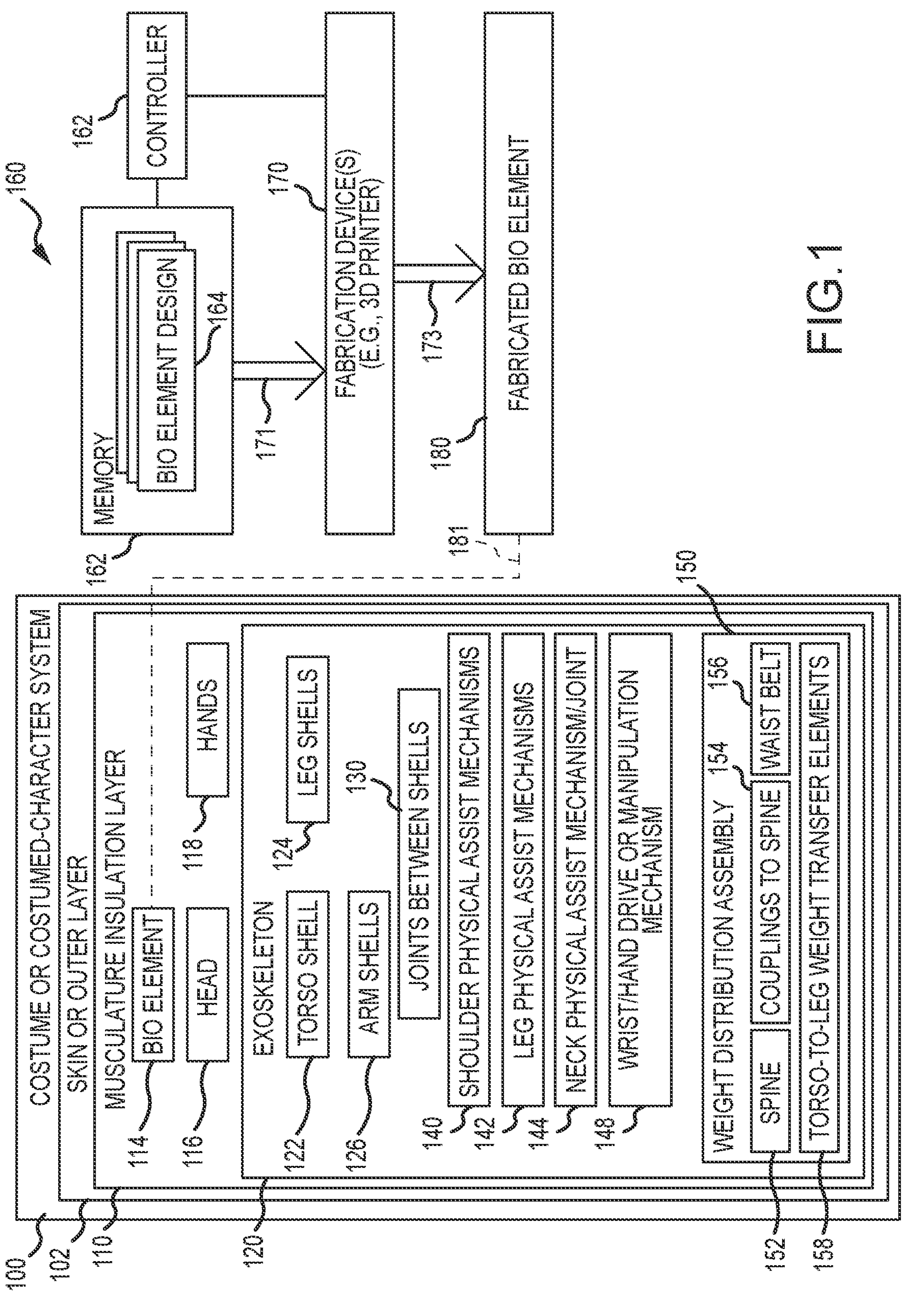
FIG. 1 is a functional block diagram of a costumed-character system (or more simply "a costume") along with a portion of costume design and fabrication system according to the present description.

Prior to turning to specific examples of the exoskeleton and its components and of the new bio elements used to provide desired musculature effects, it may be useful to more generally describe the new costume and fabrication process created by the inventors. FIG. 1 is functional block diagram of a costumed-character system (or more simply "a costume") 100 along with a portion of costume design and fabrication system 160 according to the present description. Often, the costumed-character system 100 will be designed to present a bipedal character such as a superhero, a storybook, movie, or television character, an alien, a robot, or the like, and this character may be much larger than the human performer that wears and operates the costumed-character system 100. This human performer is not shown, but it will readily be understood from later figures and discussion that the performed would be positioned within the exoskeleton 120.

As shown, the system 100 includes a skin or outer layer 102 that would be used to simulate the outward appearance of the character being provided by the system 100, and the layer 102 may include materials to replicate human or other skin, clothing, fur, features, and so on. The system 100 further includes an exoskeleton 120 configured to receive the body of a human performer and to physically support the skin or outer layer 102. Further, a musculature simulation layer 110 is disposed between the inner surfaces of the skin 102 (at least in some locations) and outer surfaces of the exoskeleton 120. This layer 110 includes one-to-many bio elements 114, which are designed to simulate muscles, fat, and other biological features under the sink 102. To this end, the bio elements 114 may take the form of compressible foam elements shaped and sized as is well known in the field or may take the form of compressible 2D or 3D mesh elements, as discussed in detail below.

As shown, the fabrication/design system 160 may include data storage or memory 162 that is operated by a controller 162 to store a library of bio element designs 164. Each of these designs 164 may define a 2D or 3D configuration of a mesh or solid outer body design as well, in some cases, the configuration for an optional inner bladder that can be output 171 by the controller 162 (e.g., as a digital file) to a fabrication device(s) 170, such as a 3D printer. The output of the device 170 as shown with arrow 173 will be a fabricated bio element 180 that can be used as shown with arrow 181 as a bio element t114 in the system 100. The design 164 will define the size, shape, and pattern of the mesh element as well as useful materials for its fabrication to achieve a desired compressibility and/or action in use in the system 100, e.g., to simulate a muscle such as a bicep that may bulge a desired amount when the bio element 114 is compressed.

The system 100 is also shown to include a head 116 and hands 124, and these may be manipulable by the performer or with included motorized components via an onboard or offboard controller. The head 116 and/or the hands 118 may be separately covered with a skin and/or musculature elements or be enclosed in the skin 102 and, optionally, include bio elements 114. The head 116 and the hands 118 are configured for coupling to the exoskeleton 120 such that their weight is supported by the exoskeleton 120 along with the skin/outer layer 102 and such that, when applicable, the performer can move and manipulate/operate the head 116 and hands 118 (e.g., to move a mouth and eyes of a head 116, to open or close the fingers of a hand 118, and the like).

The exoskeleton 120 includes a torso shell 122, two leg shells 124, and two arm shells 126, and the arm shells 126 and leg shells 124 are coupled in a pivotal (or rotatable) manner to the torso shell 122 via joints 130. The appropriate bio elements 114 to provided desired muscle aesthetics are applied to outer surfaces of the shells 122, 124, and 126, and the skin or outer layer 102 is applied over the corresponding portions of the shells 122, 124, and 126. The head 116 and hands 118 are also coupled to the exoskeleton 120 at the top opening of the torso shell 122 and ends of the arm shells 126, respectively.

To facilitate realistic movements and locomotion by a performer, the exoskeleton 120 is configured to provide non-powered or "passive" movement or lift assist devices, which are described in more detail with reference to later figures. As shown in FIG. 1, though, these assist devices include shoulder physical assist mechanisms 140 (one or more in each shoulder portion of the torso shell 122), leg physical assist mechanisms 142 (one or more in each leg shell 124 and/or at the joint between the torso shell 122 and the leg shells 124), and a neck physical assist mechanism/joint 144 (disposed between the upper or head opening in the torso shell 122 and the head 116 to provide a pivotal and/or rotatable coupling of the head 116 to the torso shell 122). The exoskeleton 120 further includes a wrist and/or hand drive or manipulation mechanism 148 at the end of each arm shell 126 to allow the performer to rotate and/or manipulate the hands 118 (e.g., to flex open and closed one or more of the fingers of the hand 118). The assist mechanisms 140, 142, and 144 are preferably passive and do not include motors or other components requirement electricity or other power to operate, and, to this, end they may include gas springs, pneumatic or other pistons, and one or more springs or resilient members that provide spring-like functions (e.g., that can be compressed or moved from an at-rest position to store potential energy that can be released to return the member to its at rest position or form (e.g., to provide physical assist)).

The assist or lift devices 140, 142, and 144 help a performer to move the shell components via the joints 130 along with the sometimes heavy skin or outer layer 102. Further, though, the exoskeleton 120 is configured to transfer the weight of the costume 100 to the ground or other surface supporting the costume 100 and a performer positioned within the exoskeleton 120. To provide this functionality, the exoskeleton 120 is shown to include a weight distribution assembly 150. This assembly 150 includes a spine 152 that may be mounted to a back surface of the torso shell 122, and the spine 152 may be an elongated member (e.g., formed of a metal or other rigid and strong material) that extends vertically from the top to the bottom of the torso shell 122 where it may couple with waist ring or belt 156. The waist ring or belt 156 is configured to extend about the performer's waist when they are positioned within the exoskeleton, while typically being spaced apart some distance from the performer so that the weight of the costume 100 is not felt by the performer. Similarly, the torso shell 122 and spine 152 are also spaced apart from the performer's body to avoid that performer's joints being exposed to heavy weights.

The weight distribution assembly 150 further includes couplings 154 for joining the arm shells to the spine 152 so that the weight of these shells 126 as well as the hands 118 and skin 102 covering the arm shells 126 are borne by the spine 152 and not the performer. Further, the assembly 150 includes one or more torso-to-leg weight transfer elements 158. These elements 158 are configured to join the waist ring or belt 156 to the legs and ground such as with a connection to the leg shells or one or more support struts or rods in the leg shells 124. In this manner, the weight applies to the spine 152 is transferred or applied to the waist ring/belt 156, which then transfers the weight to the legs (e.g., leg shells or support struts/rods (shown in later figures) and the ground as the legs (or feet upon the bottom of the legs) contact the ground (or other support surface) during standing or during walking/locomotion.

With the teaching of FIG. 1 in mind, it will be seen that this disclosure generally describes materials and techniques to implement biologically inspired musculature on exoskeleton structures in a manner that allows costumes inspired by larger than average fictional characterizers to be reproduced. Consider a fictional character such as Paul Bunyon who is described as an anthropomorphic human character 7-feet tall with a 7-foot stride. Various characterizations describe or illustrate the character with super-sized musculature but a human aesthetic. To represent this character in a costume, it would be expected that arm, chest, neck, and other muscles would move and deform much like human. Although such a character could be portrayed by the relatively small number of actors having similar attributes, a much greater number of actors have the opportunity to portray the character if the physical size attributes can be implemented by an exoskeleton that is easily controlled by the actor. Moreover, in the case of super-human sized characters and non-human characters, an exoskeleton may be the only way to implement a costume.

Costumed character suits are heavy, even more so for characters who are "oversized," meaning that their body parts are larger than average adult human sizes. For this reason, the range of motion of these costumed characters has been, prior to the present innovations, considerably limited and unexpressive. Extremities like hands for oversized costumed characters are typically locked in a closed first form because the hardware required to articulate the fingers would add too much weight to the performer's arm. It is desirable to add as little weight as practical to a performer in a costume. While the present invention does not necessarily preclude all motorized power assist, it is preferable that heavy motors and powered actuation typical of task-oriented exoskeletons be minimized or eliminated.

To these ends, the exoskeleton disclosed herein implements several functional adaptations that distinguish it from task-oriented exoskeletons. For example, the illustrated implementations provide a passive, pneumatic assist (gas springs) at the scapula and shoulder joints of the character suit. The illustrated implementations provide linkage mechanisms that tie the elbow and scapula movement of the character suit to shoulder rotation. The illustrated implementations provide a sliding performer attachment mechanism that allows for dynamic shifting of geometry relations between the performer and the suit/exoskeleton. In some embodiments, the exoskeleton includes a flexible shaft that allows a performer's wrist to directly rotate the character suit's wrist. This is particularly useful for oversized character costumes where the performer's wrist is not collocated with the character suit's wrist. This may also be useful for non-human characters where geometry of the character being costumed is different from the performer.

The description teaches an exoskeleton that is positioned with respect to a performer as a skeletal intermediary between the performer and the costume exterior (e.g., skin or outer layer and musculature simulation layer). The exoskeleton includes weight bearing attachments to the costume's skin or outer layer(s) and mechanical linkages that redirect weight of the costume towards the ground below a performer rather than into the performer's body (e.g., the performers back or shoulders). The exoskeleton is provided with pneumatic and elastic passive assist mechanisms coupled proximate to joint areas to aid in moving, rotating, and lifting appendages under performer control. Further, the illustrated implementations provide cable-driven mechanisms for finger articulation and wrist curl. Additionally, the illustrated implementations provide improved range of motion at the spine for more ergonomic and aesthetically accurate operation. Still further, the illustrated implementations redirect the weight of the costume into a ring or belt n the exoskeleton proximate to the performer's hips for improved ergonomic operation and then into the ground/support surface via the legs and feet.

Referring to FIG. 2 through FIG. 9, several examples of printable 3-D structures for implementing musculature or bio elements as shown in FIG. 1 are illustrated. The examples are each designed to attach to an exoskeleton and be actuated by motion of the exoskeleton. In some cases, they are also optionally actuated by pneumatic or hydraulic bladders or may be actuated by motors or other actuators to allow muscle flex in place without exoskeleton movement.

Figure 2:
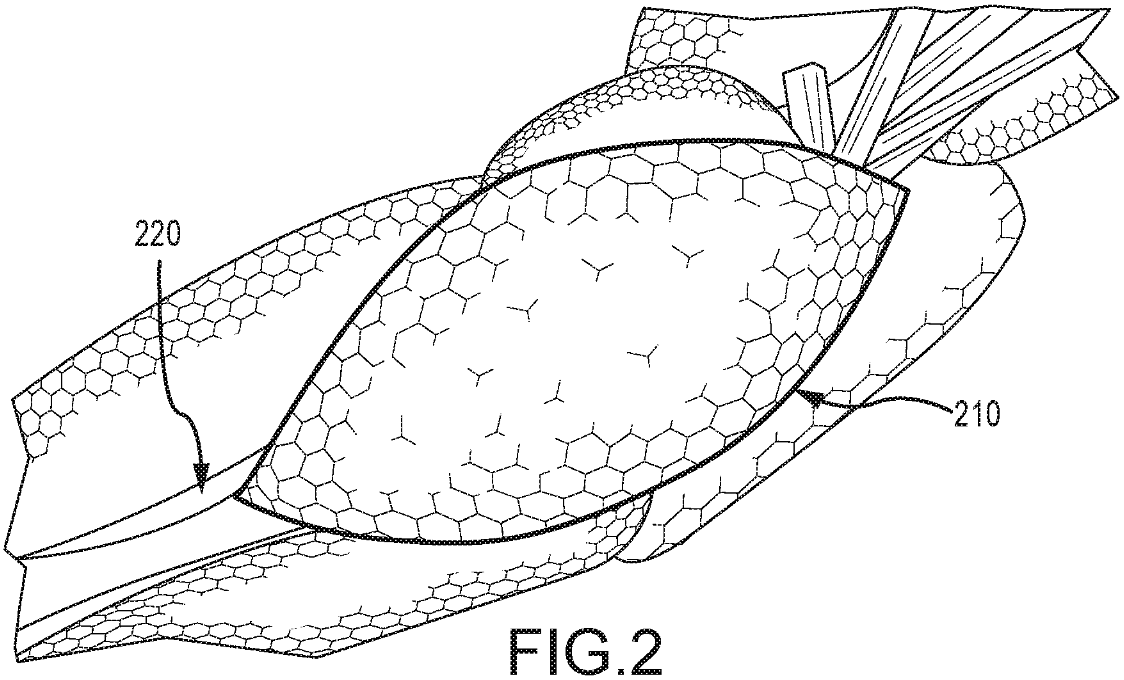
FIG. 2 illustrates an example 3D printed muscle structure or bio element in a first pose on a portion of an exoskeleton.
Figure 3:
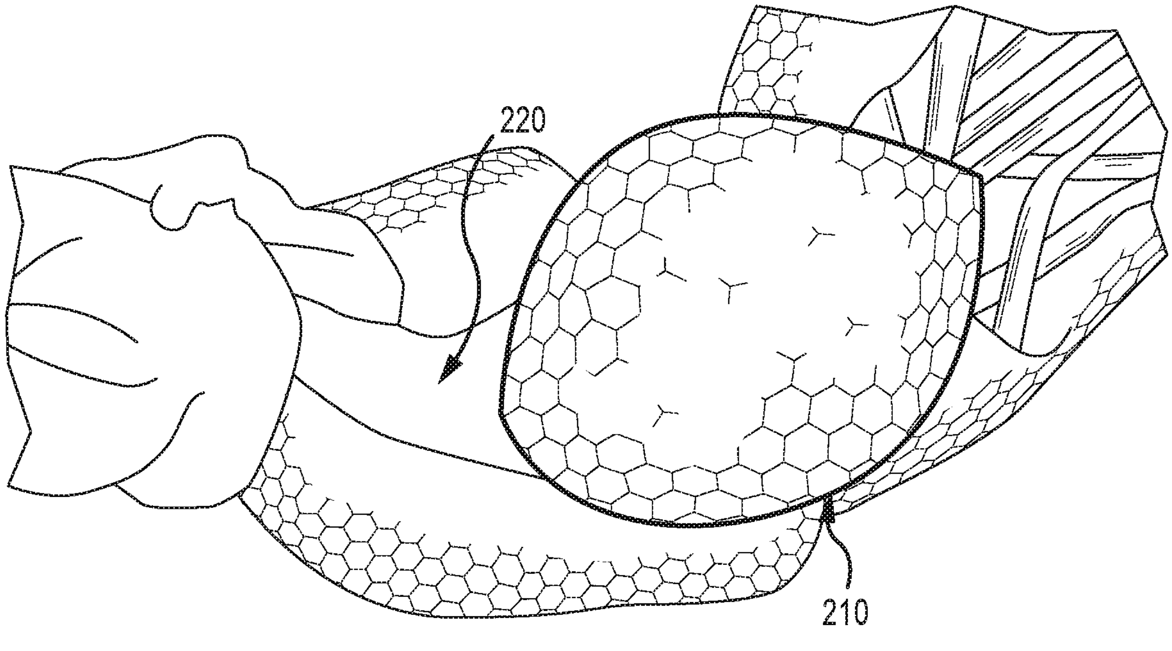
FIG. 3 illustrates the example 3D printed muscle structure or bio element of FIG. 2 in a second pose.

Particularly, FIG. 2 illustrates an example 3D printed muscle structure or bio element 210, that is attached (at least at opposite ends) to a portion of an exoskeleton 220 of the present description, e.g., on an exterior surface of an arm shell or the like). In FIG. 2, the bicep or bio element 210 is shown in an unflexed state or in a first pose. The bicep or bio element 210 was designed or configured to simulate a strong character's bicep with significant amount of bulging between this first pose of FIG. 2 and the second pose or flexed state shown in FIG. 3 for the bio element 210, with the movement between the poses being caused by an operator moving the underlying exoskeleton.

Figure 8:
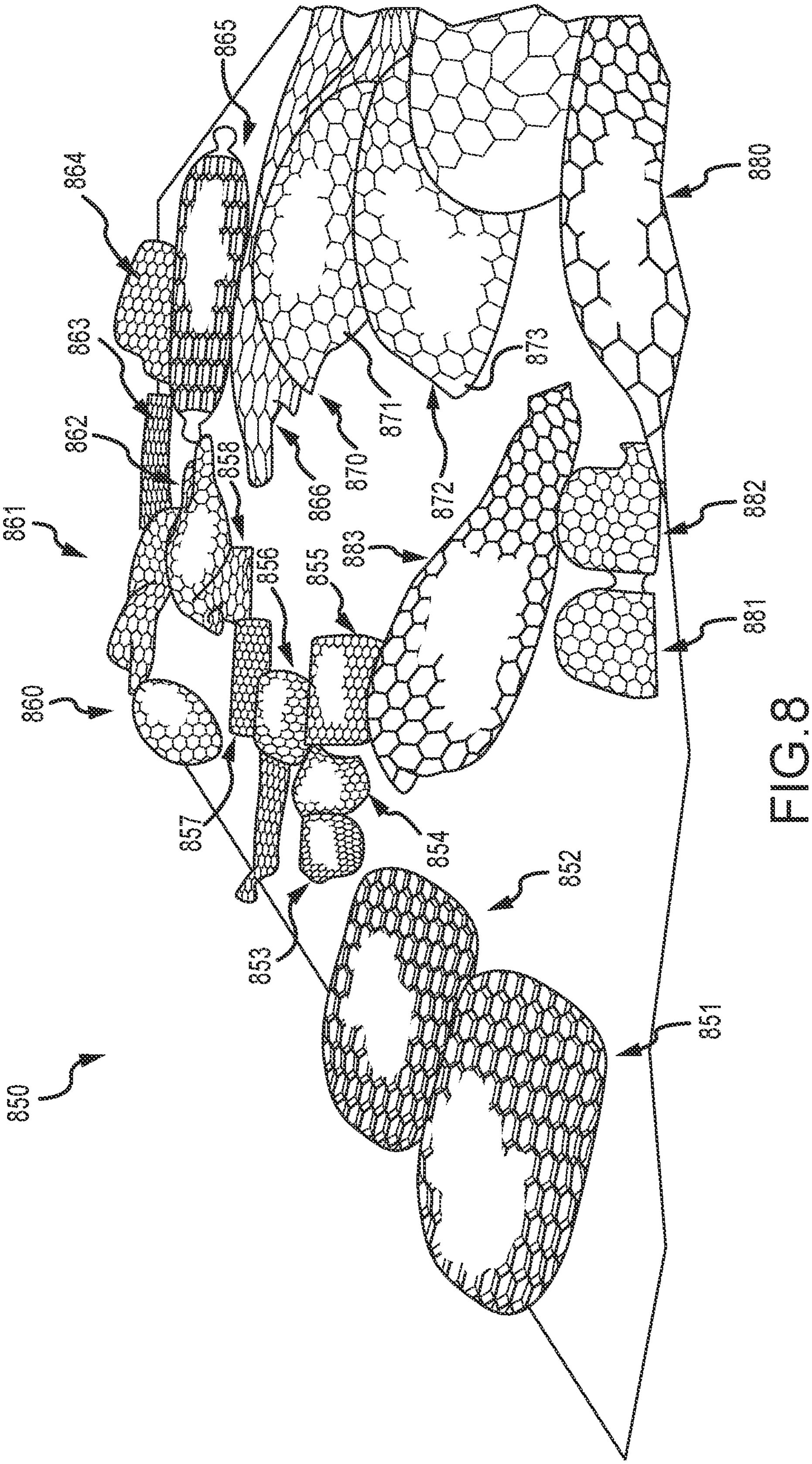
FIG. 8 illustrates a library of fabricated (e.g., 3D printed) bio elements that may be used to form a musculature simulation layer in a large costumed-character system or costume of the present description such as that shown in FIG. 1.

A library 850 of muscle networks or patterns ("bio elements") 851, 852, 853, 854, 855, 856, 857, 858, 860, 861, 862, 863, 865, 865, 866, 870, 872, 880, 881, 882, and 883 is shown in FIG. 8. Each bio element 851, 852, 853, 854, 855, 856, 857, 858, 860, 861, 862, 863, 865, 865, 866, 870, 872, 880, 881, 882, and 883 is formed so as to deform in a predictable and particular fashion in response to applied forces (stress, strain, compression, etc.). Each member of the library is characterized as a 3-D or 2-D closed-cell mesh or lattice structure with plurality of open cells defined by cell walls. In some cases, the cells of the bio element may be filled such as for bio elements 880 and 883 those shown in FIG. 8 that appear similar to tiles on a mesh backing. In some cases, a bladder or other filling may be enclosed within the outer bio element structure as shown with bladder 871 in bio element 870 and bladder 873 in bio element 872. The mesh/cell-filled and bladder-containing structures, like the other structures, provide unique dynamic aesthetic performances when actuated. FIG. 8 illustrates an array of exemplary muscle designs illustrating the great variety that can be achieved using techniques in accordance with the present invention. Some of the illustrated examples are hollow, others filled with bladders. Some have hollow lattice structures while others have filled or hybrid filled lattice structures. The shapes of each musculature example are designed to mimic a particular muscle shape and also the dynamic shape change that the muscle would take on in a biological system.

Dynamic appearance refers to how the muscle structure (or musculature simulation layer 110 in FIG. 1) changes shape when actuated by external forces, particularly as the structure changes shape under tension and compression. Perceptible aesthetic changes include distribution of bulk throughout the structure, with some areas becoming larger and bulking while other zones smaller and elongate under activation. With the lattice structure or mesh configuration of each bio element, the dynamic response is distinct as compared to a solid material. The structure can be compressible so volume is not always conserved, or may appear conserved in some parts of the structure.

Dynamic appearance is determined by various factors including: (a) cell size; (b) cell shape; (c) cell wall (or mesh) thickness; (d) density of cell-to-cell interconnections; (e) material properties such as elasticity, memory, malleability, spring constant, and the like; (f) unstressed shape and dimensions; and (g) location of connection points to the actuating exoskeleton. Lattices can be formed as 2D structures that are conformable around other materials or structures such as inflatable bladders. In this manner, the actuated muscle network can apply force to the inflatable bladder such that the combined dynamic behavior resembles a desired muscle or dynamic skin movement.

Figure 4:
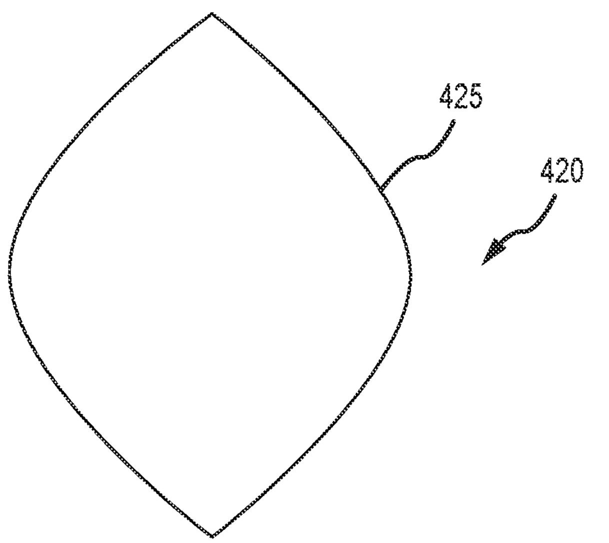
FIG. 4 is a screen shot of a computer screen or monitor during a computer simulation of a desired or target muscle deformation for a particular animation task.
Figure 5:
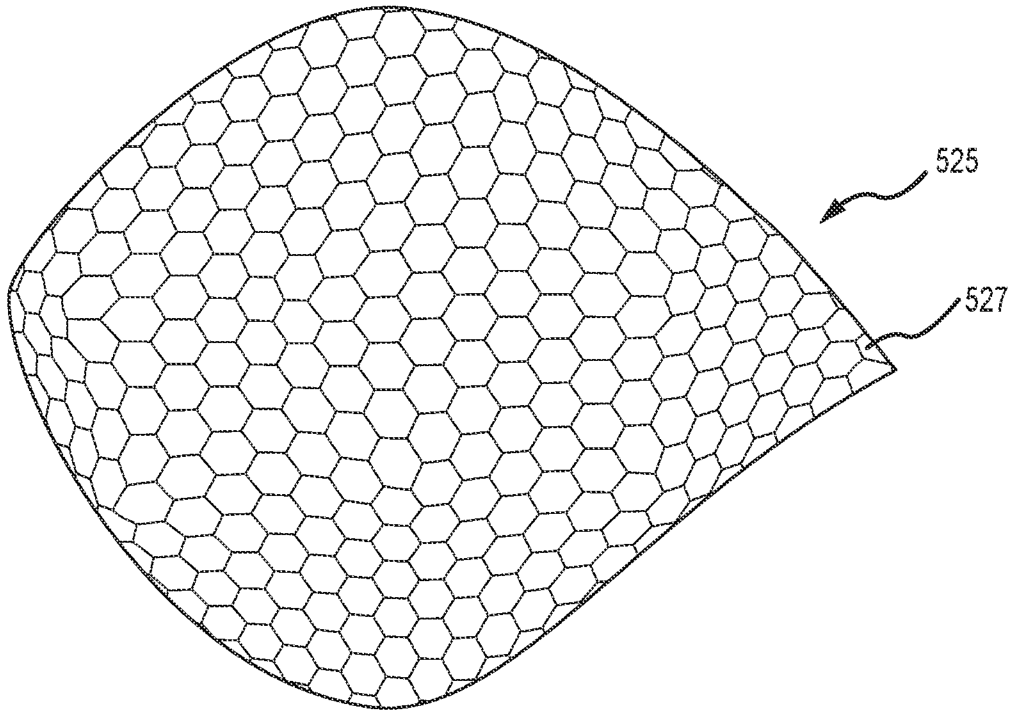
FIG. 5 illustrates a computer rendering of a printable lattice structure (or bio element) that can be printed or otherwise fabricated to produce a physical implementation of the muscle structure or bio element as shown in FIGS. 2-4.

The illustrated examples of library 850 in FIG. 8 (as well as other figures such as FIGS. 2 and 3) show structures that are 3D printed with thermoplastic materials, although alternative implementations may use metals or other materials. 3D printing is one exemplary technique of fabrication because it enables ready modeling of dynamic performance and transfer of models to 3D printing devices to produce physical implementations, which is shown with screen shot 420 in FIG. 4 showing a muscle flex simulation of a bicep 425 via software and in FIG. 5 showing a modeled design of a lattice structure or mesh element (or "bio element") 525 (including end connectors for use in attachment to an exoskeleton) based on the simulated bicep 425. A digital file defining the bio element 525 would then be stored in a library of bio elements for later use in fabricating a musculature simulation layer for a costume of the present description.

In a typical use case, a target character such as an animated or CGI character is studied to determine how its drawn or simulated musculature performs aesthetically. Typically, the dynamic musculature demonstrated by an animated or CGI character will vary significantly at different points of the character's body. Those variations, which are also often distinct from normal human aesthetics, are important to creating the recognizable visual appearance and performance of the character. The improvements described herein provide better ways to faithfully reproduce the visual appearance and performance even when they are significantly exaggerated via the exoskeleton and the musculature simulation layer, from what the human performer inside the costume is able to accomplish.

Figure 6:
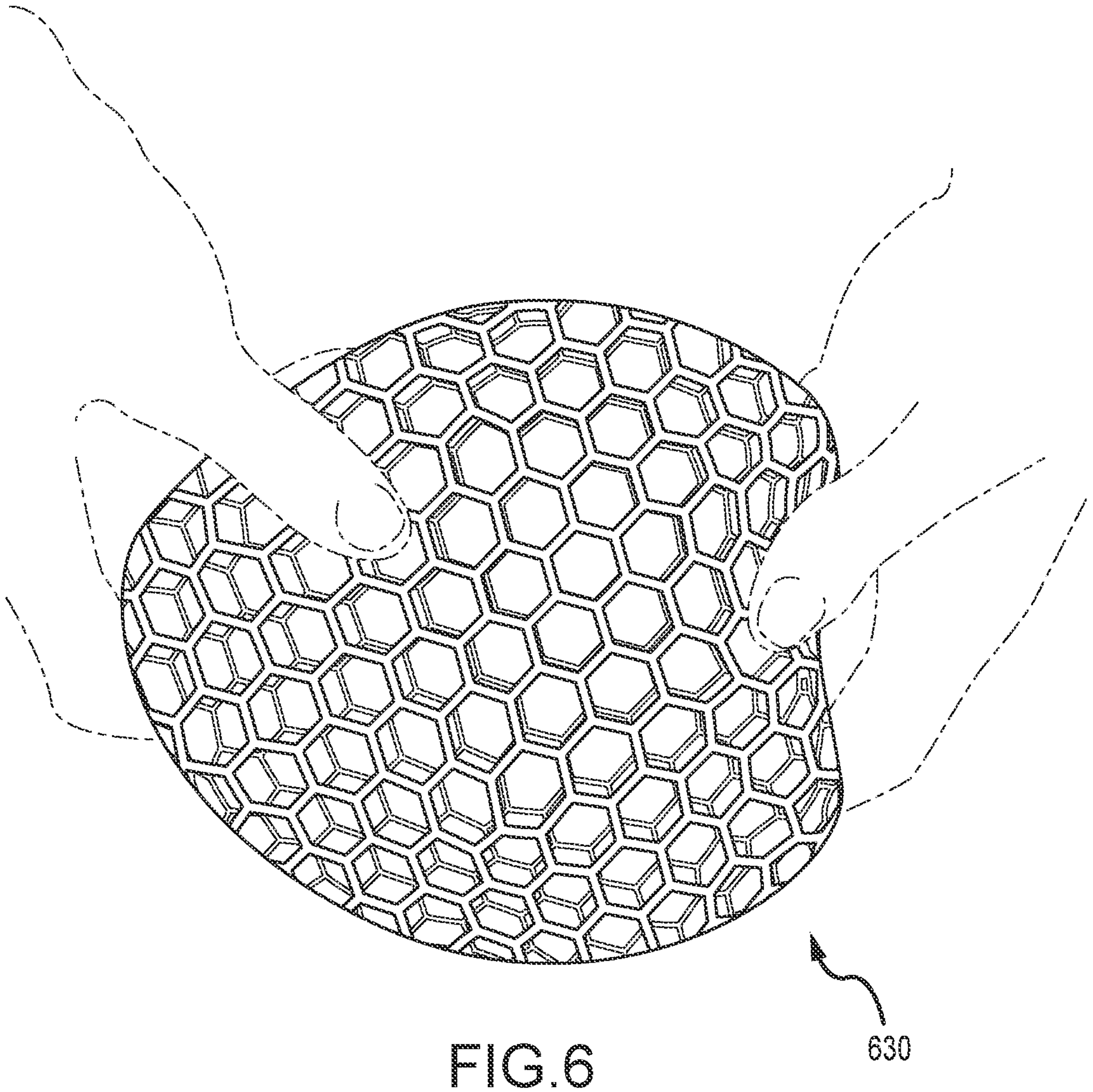
FIG. 6 illustrates an alternative structure or bio element in a non-flexed pose or state that is suitable for a dynamic performance that is distinct from the bio element of FIG. 5.
Figure 7:
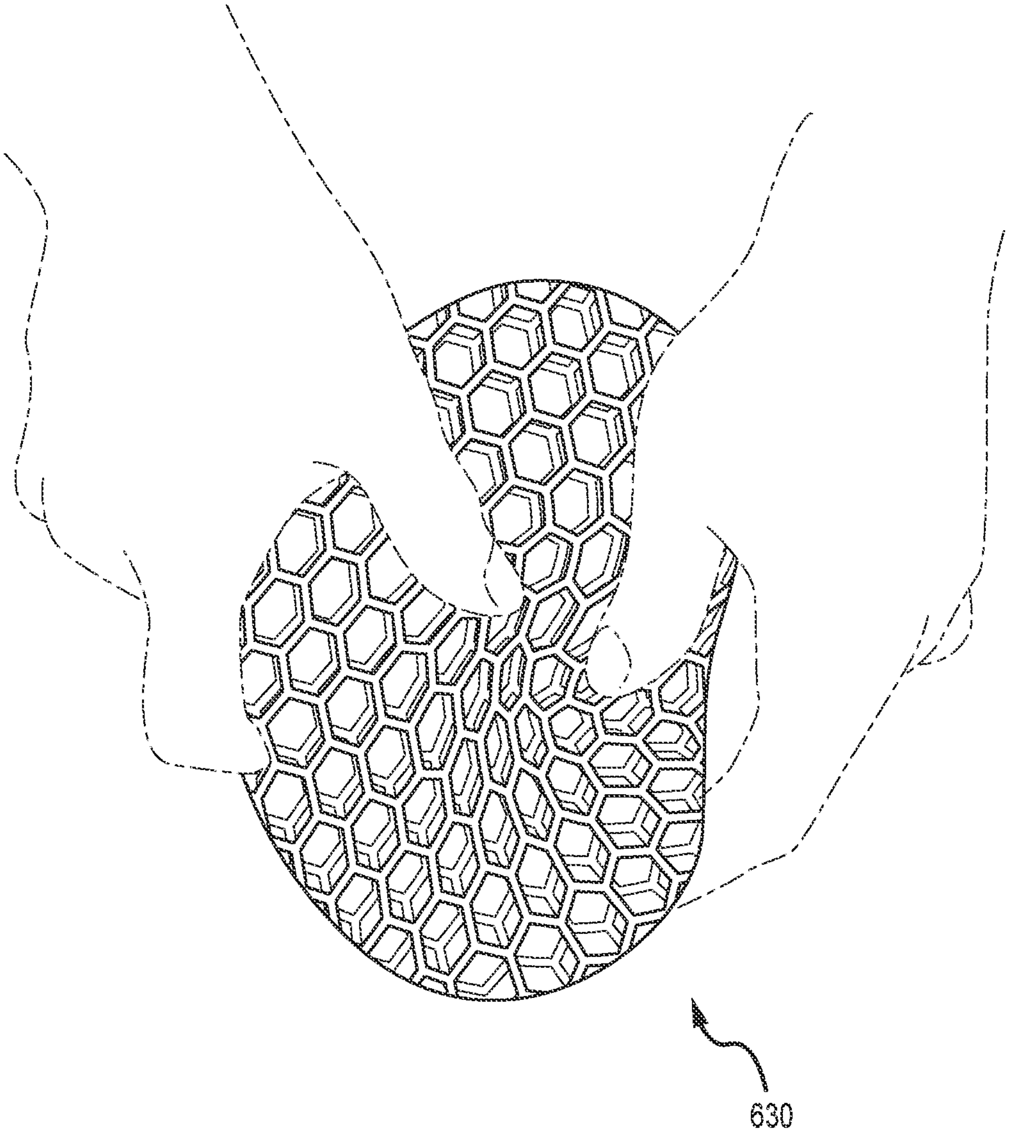
FIG. 7 illustrate the bio element example of FIG. 6 in a second pose or flexed state.

FIGS. 6 and 7 illustrate an embodiment of a deltoid muscle bio element (or mesh element or lattice structure) 630 in two states or poses, respectively, with the bio element 630 being configured to model typical biological behavior of folding in on itself in a particular region. The lattice structures shown in the bio element 630 were biased in such a way as to make the deltoid bend or fold at the desired location when force is exerted on the outer perimeter as shown in FIG. 6B (e.g., when "flexed" or in the flexed or second pose). FIGS. 6A and 6B show the bending force being manually applied, but, in a complete costume, the places where the deltoid structure 630 is manually gripped would be affixed to a mechanical joint in the costume exoskeleton such as the shoulder/upper arm joint such that the exoskeleton applies the desired force to move from the first and second poses (or unflexed and flexed states or poses).

Figure 9:
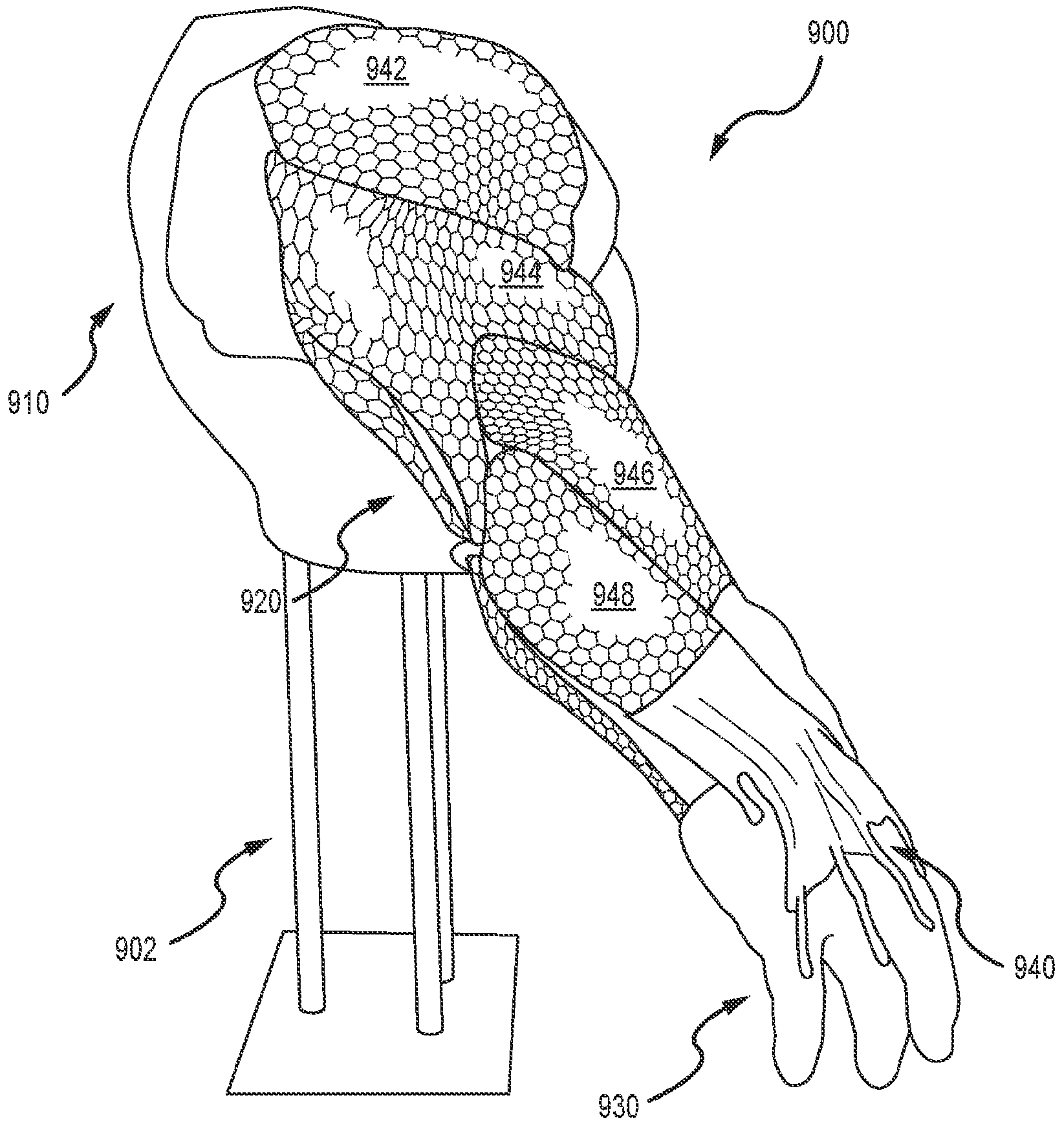
FIG. 9 illustrates a partial costume system or costume including a plurality of bio elements (or lattice structures or mesh elements) as part of a musculature simulation layer provided on an arm of an exoskeleton according to the present description.

FIG. 9 illustrates a partial costume system or costume 900 including a plurality of bio elements (or lattice structures or mesh elements) 942, 944, 946, 948 as part of a musculature simulation layer 940 provided on an arm 920 of an exoskeleton according to the present description. As shown, in place of lower torso portion of an exoskeleton, a work stand 902 is provided that supports a torso shell that is covered with a musculature layer or shell 910. From a shoulder joint of the torso shell (covered from view by the torso shell 910), an arm rig or arm 920 is pivotally mounted to the torso shell or portion of the exoskeleton, and at the lower end of the arm rig 920 is provided a hand 940, which may or may not be manipulable by a performer.

FIG. 9 illustrates a plurality of 3D-printed latticed muscle components or bio elements 942, 944, 946, and 948 coupled to the exoskeleton and costume arm shell components to form a musculature simulation layer 940 of the arm rig or costume arm 920. Each muscle component 942, 944, 946, and 948 (which may take one or more of the forms shown in the library 850) are attached to the exoskeleton, the shell, and/or each other such that forces are placed on the musculature components 942, 944, 944, and/or 948 individually or in combination(s) to achieve dynamic aesthetic shape change when in motion triggered or forced by movements of a human performer within the exoskeleton.

Figure 10:
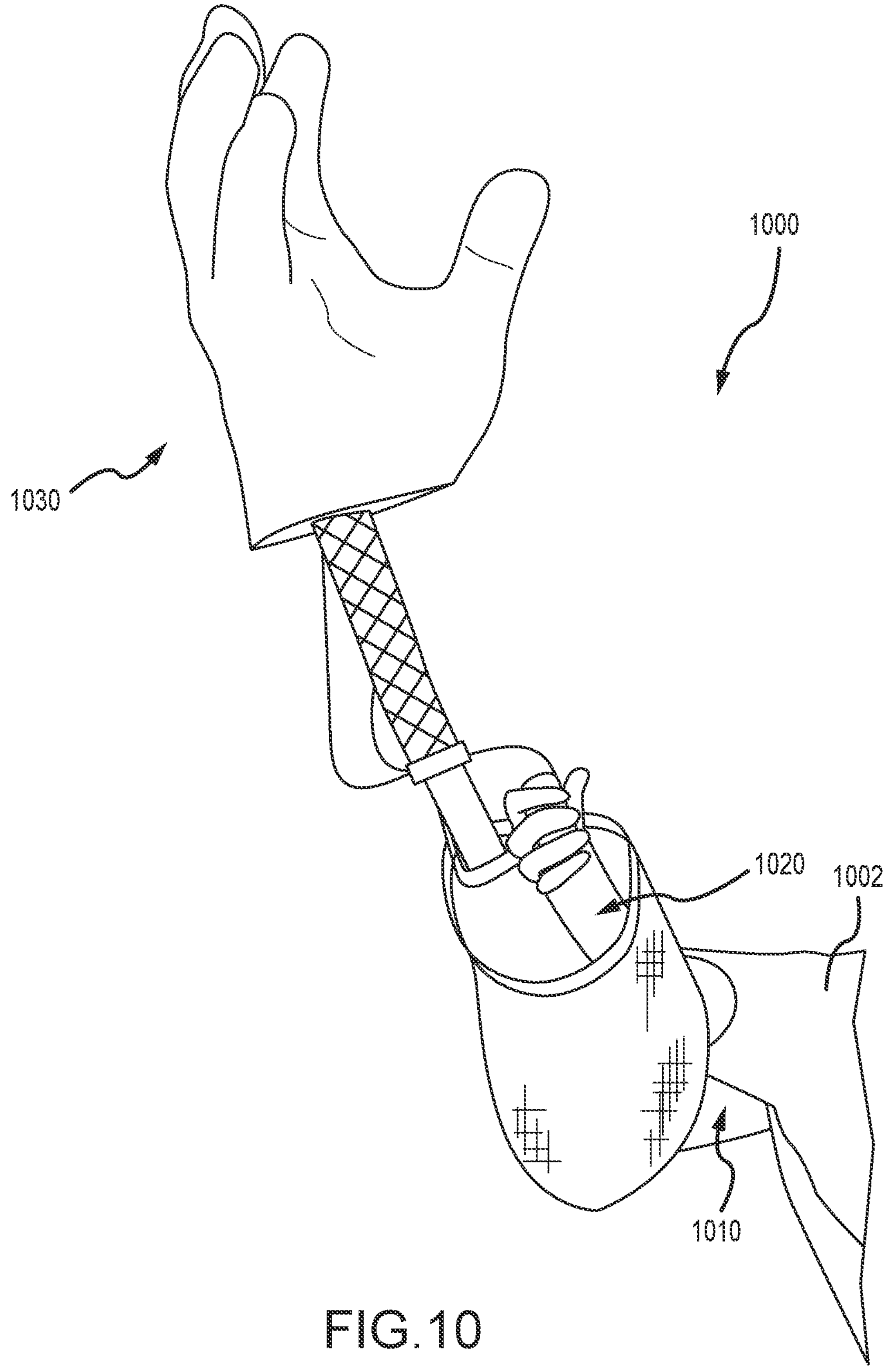
FIGS. 10-18 illustrate various views of a costume arm or arm rig without the musculature simulation layer and outer layer/skin applied to better show components and features of the exoskeleton including passive assist mechanisms.

FIGS. 10-18 illustrate various views of a costume arm or arm rig 1000 without a musculature simulation layer and an outer layer/skin applied to better show components and features of the exoskeleton including passive assist mechanisms. FIG. 10 shows the arm or arm rig 1000 being operated by a human performer or actor 1002 (shown outside the exoskeleton's torso for illustration purposes). The rig 1000 includes an arm shell 1010, upon which a musculature simulation layer would be applied as shown in FIG. 9 and through which the performer 1002 extends their own arm. The rig 1000 further includes a manipulable hand 1030 supported by the exoskeleton via the shell 1010 and/or support members extending through the shell 1010. The rig 1000 further includes a hand drive or manipulation mechanism 1020, and FIG. 10 shows the human performer 1002 operating or using this mechanism 1020 to, via a cable drive system, to open and close the fingers of the hand 1030 and/or to rotate the wrist between the shell 1010 and the hand 1030.

Figure 11:
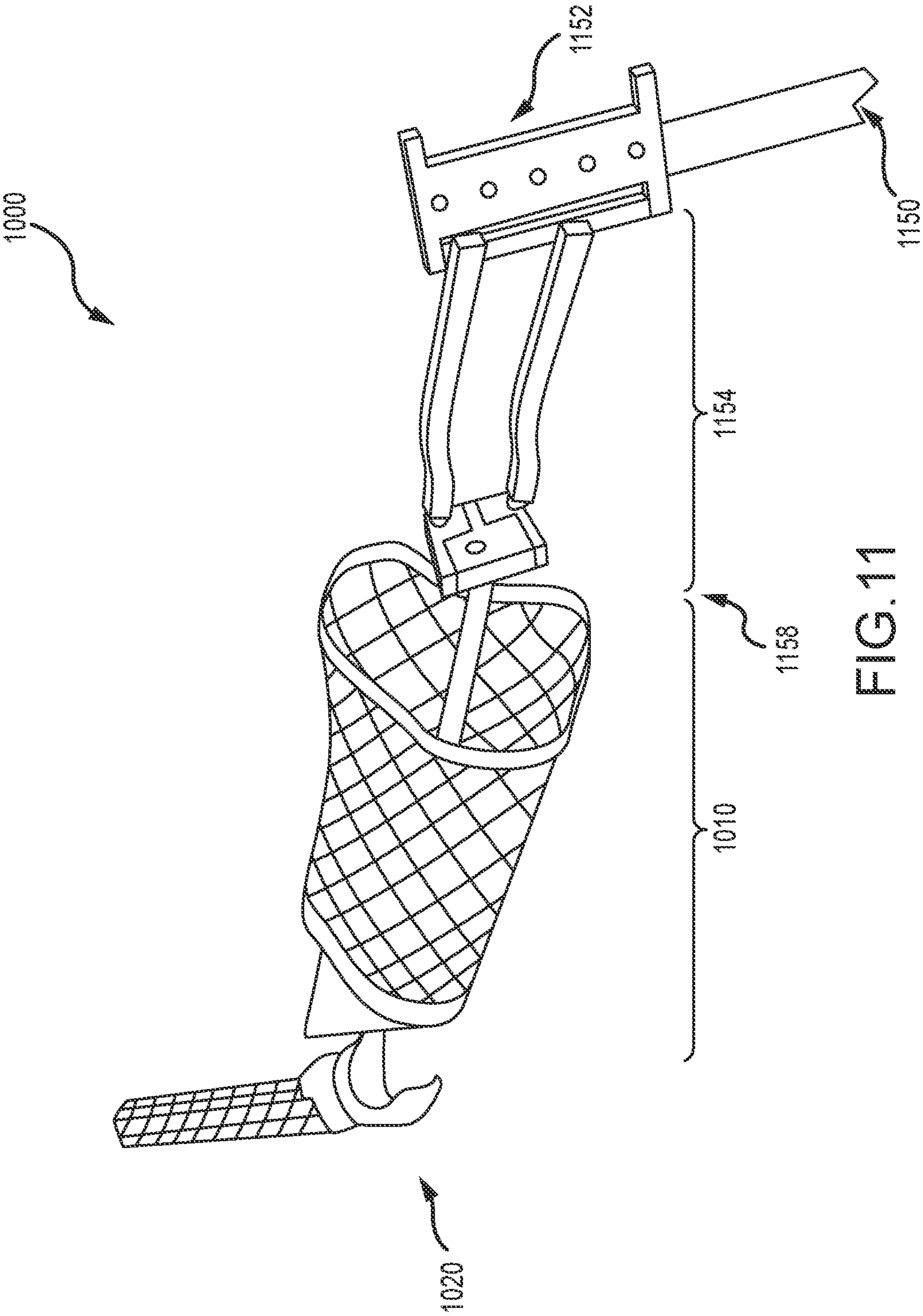

FIG. 11 illustrates additional features of the exoskeleton including the arm rig 1000. Particularly, the exoskeleton is shown to include a spine 1150 for transferring weight downward to the ground and also for centrally supporting the arm rig 1000. The arm rig 1000 is attached to the spine 1150 via a shoulder joint 1158 that pivotally couples the arm shell 1010 to a character shoulder/clavicle member 1154 (here made up of two elongated members typically arranged parallel, formed of rigid material such as a steel, a hard plastic, or the lie, and pivot pivotally supported at both ends). Opposite the arm shell 1010, the shoulder/clavicle member 1154 is pivotally attached to the spine 1150 proximate to an inner or first shoulder physical assist mechanism 1152 (which may include a gas spring compensation and a linkage chain to assist lifting or moving the mechanism 1152 relative to the spine 1150.

Figure 12A:
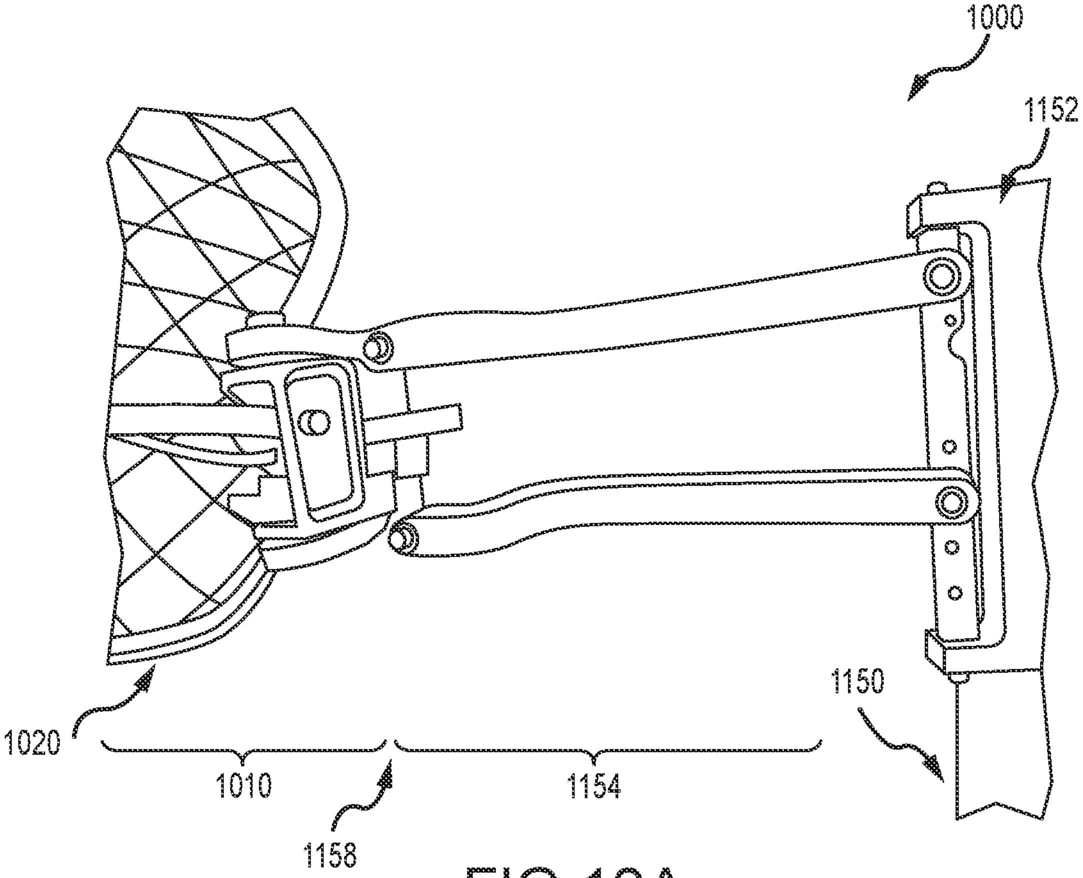
Figure 12B:
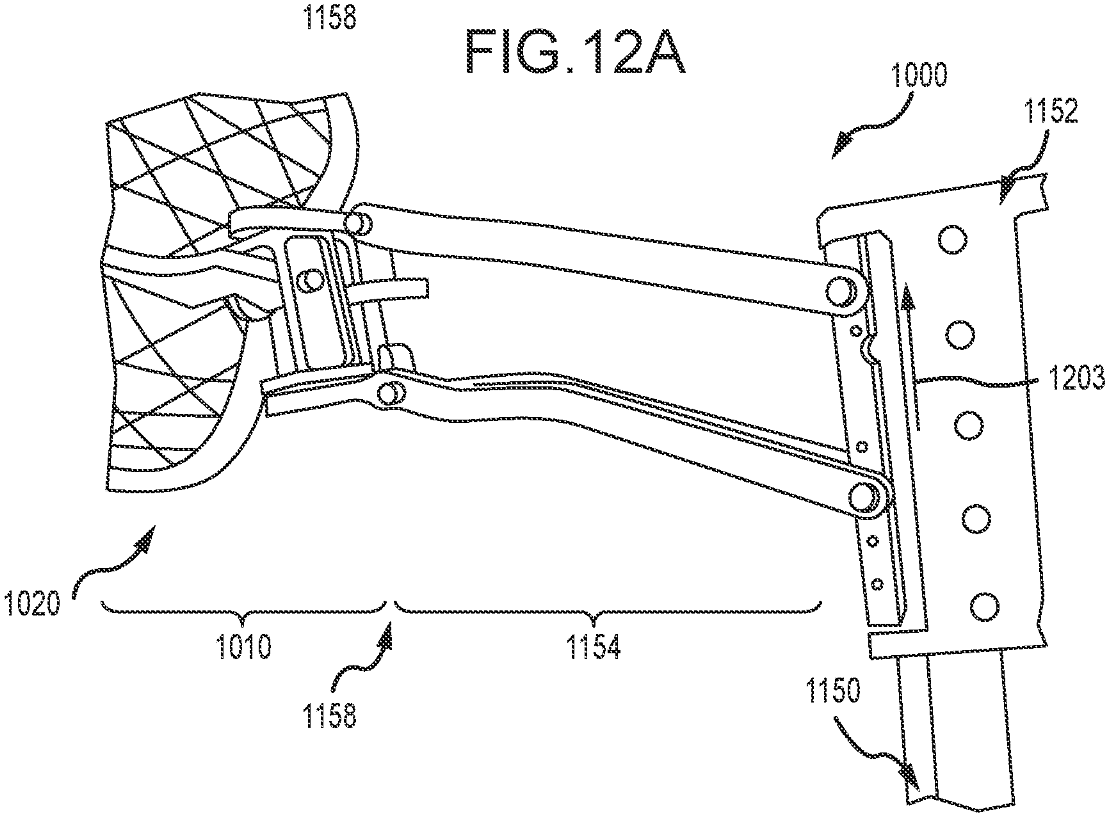
Figure 13A:
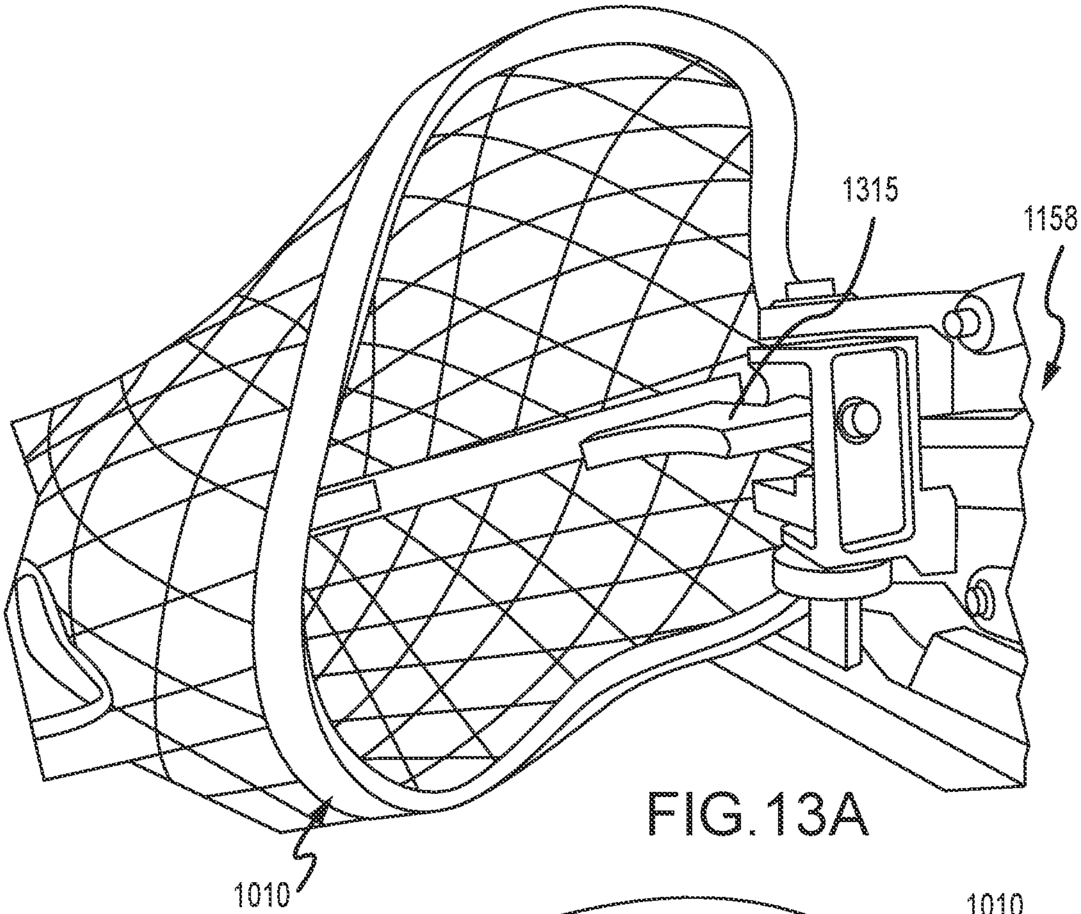
Figure 13B:
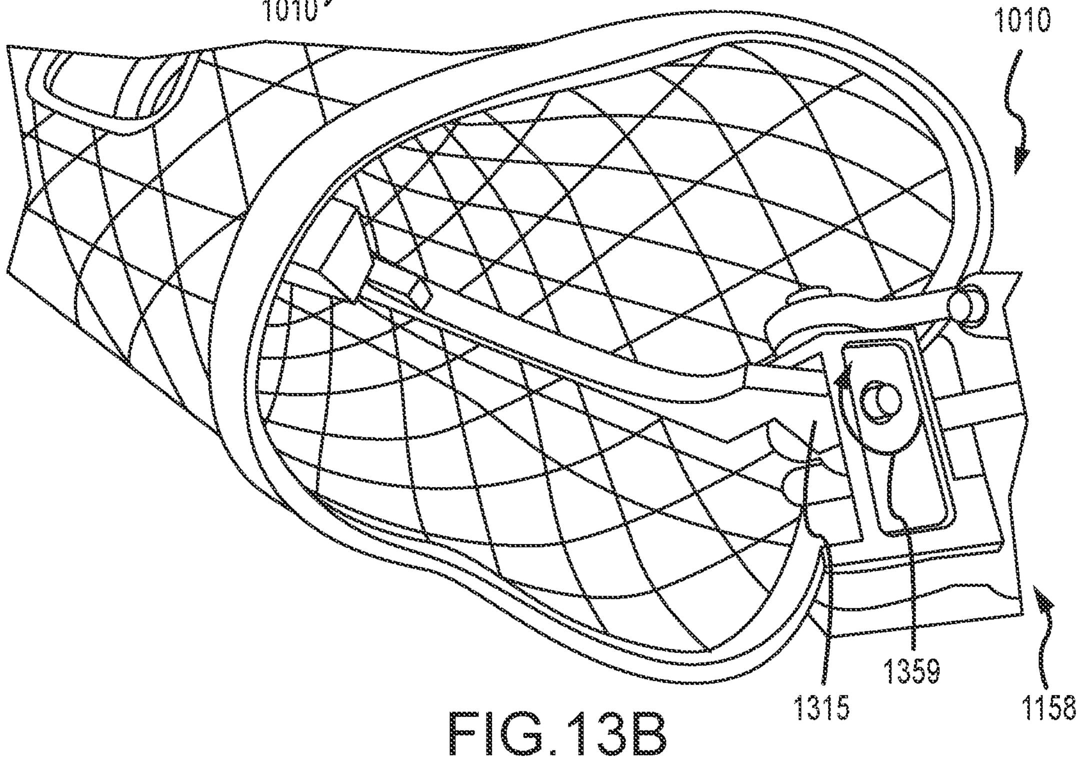

In this regard, FIG. 12A shows the shoulder/clavicle member 1154 in a rest or first position while FIG. 12B shows the member 1154 in raised or second position or pose. The passive assist mechanism 1152 (again, while not shown this may take a variety of forms including a gas spring device combined with one or more linkage chains or cables) attached to the spine 1150 acts to lift the character shoulder/clavicle member 1154 as shown with arrow 1203 in relation to the height of the character shoulder joint 1158. Similarly, FIG. 13A shows the arm shell 1010 in a first or lower position or pose while FIG. 13B shows the arm shell 1010 in a second or raised position or pose. While not shown, a second passive shoulder assist or lift mechanism is provided in or proximate to the shoulder joint, and it functions to lift as shown with arrow 1359 the arm shell 1010 via pivotal coupling at the joint 1158 to an elongated arm support 1315 running along an inner surface (and attached to) the arm shell 1010.

Figure 14:
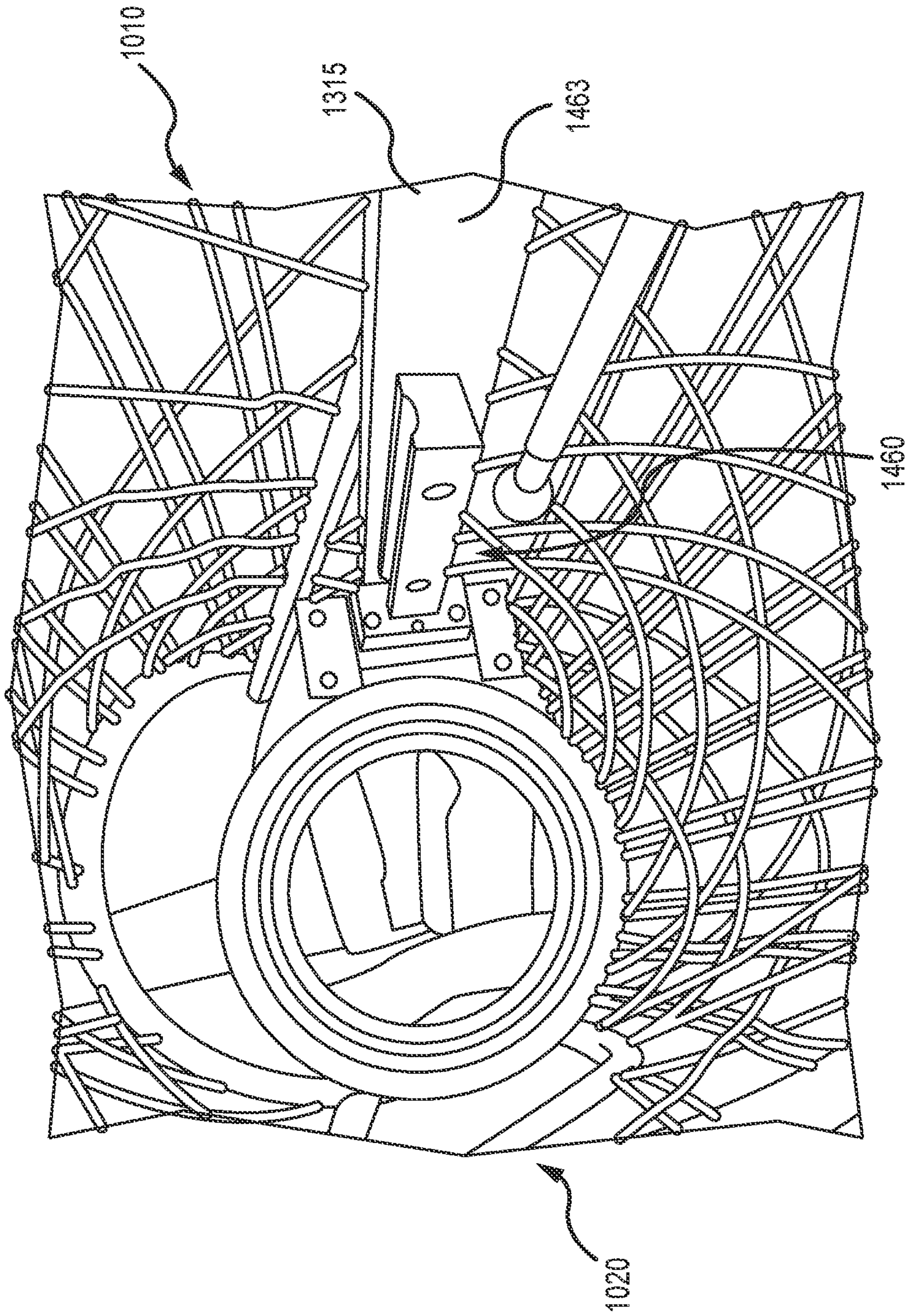

To facilitate use of the exoskeleton and costume with the exoskeleton by performers of varying sizes, FIG. 14 illustrates a size adjustment assembly 1460 that is disposed upon the elongated support 1315 of the arm shell 1010. The assembly 1460 may be configured as shown to provide a linear sliding movement as shown with arrow 1463 of the hand drive/manipulation assembly 1020 relative to the outer end of the arm shell 1010. This linear slide hand attachment corrects for geometric disparities between the performer and the costume as well as variances of body lengths from performer to performer.

Figure 15A:
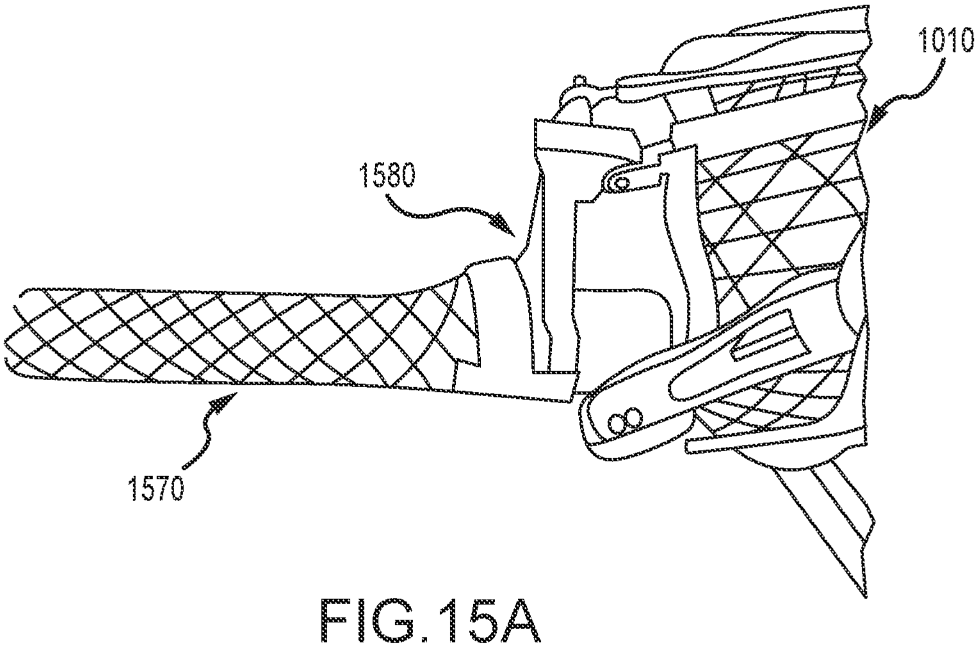
Figure 15B:
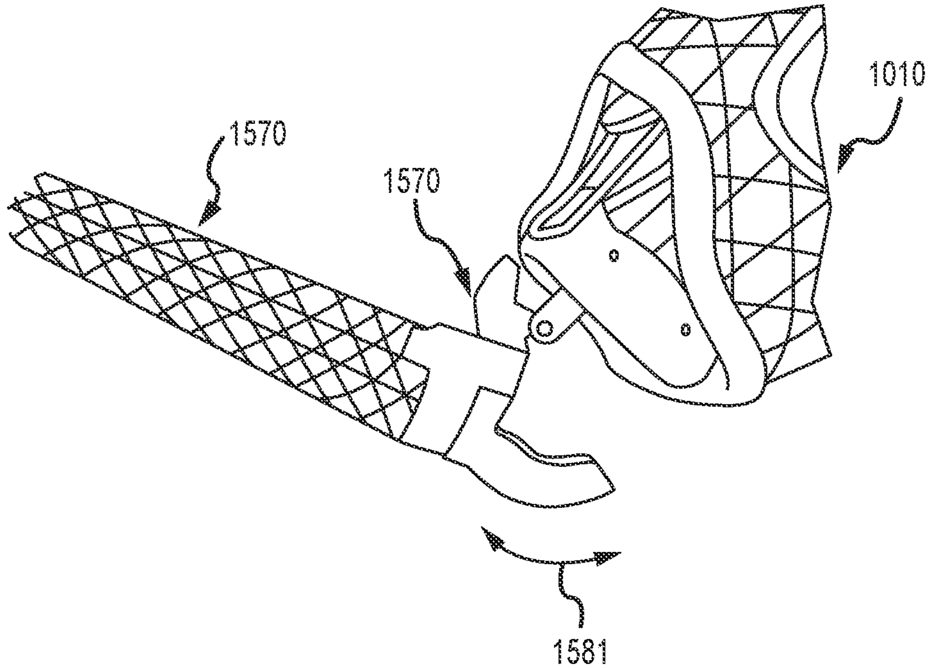

FIGS. 15A and 15B illustrate further details of the arm rig 1000 and its underlying exoskeleton components. Specifically, the arm shell 1010 is shown to be pivotally coupled at its outer end to a character forearm member 1570 via an elbow joint 1580 that allows pivotal movement of the member 1570 relative to the arm shell 1010. An additional passive assist mechanism may be provided on, in, or proximate to the joint 1580 (such as a linkage between the character elbow joint 1580 and the shoulder or should joint 1158) to allow for sympathetic elbow bend as shown with arrow 1581 in FIG. 15B in relation to the height of the character shoulder joint. FIG. 15A shows the forearm 1570 in a first or straightened position or pose while FIG. 15B shows the forearm 1570 in a second or bent position or pose.

Figure 16A:
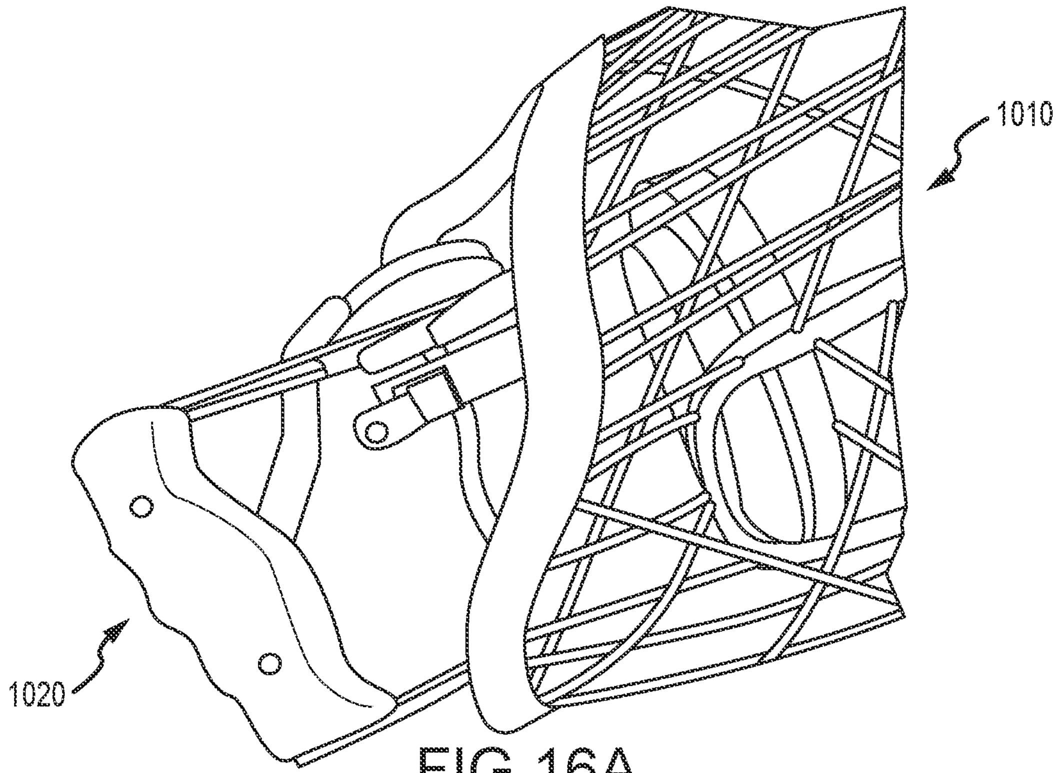
Figure 16B:
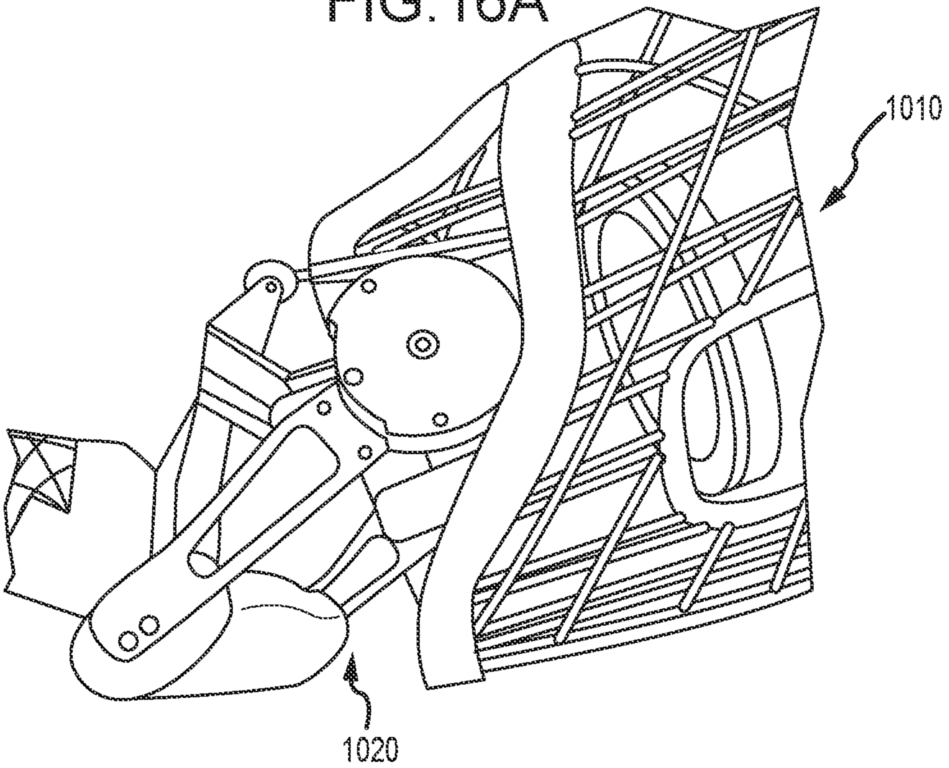
Figure 17:
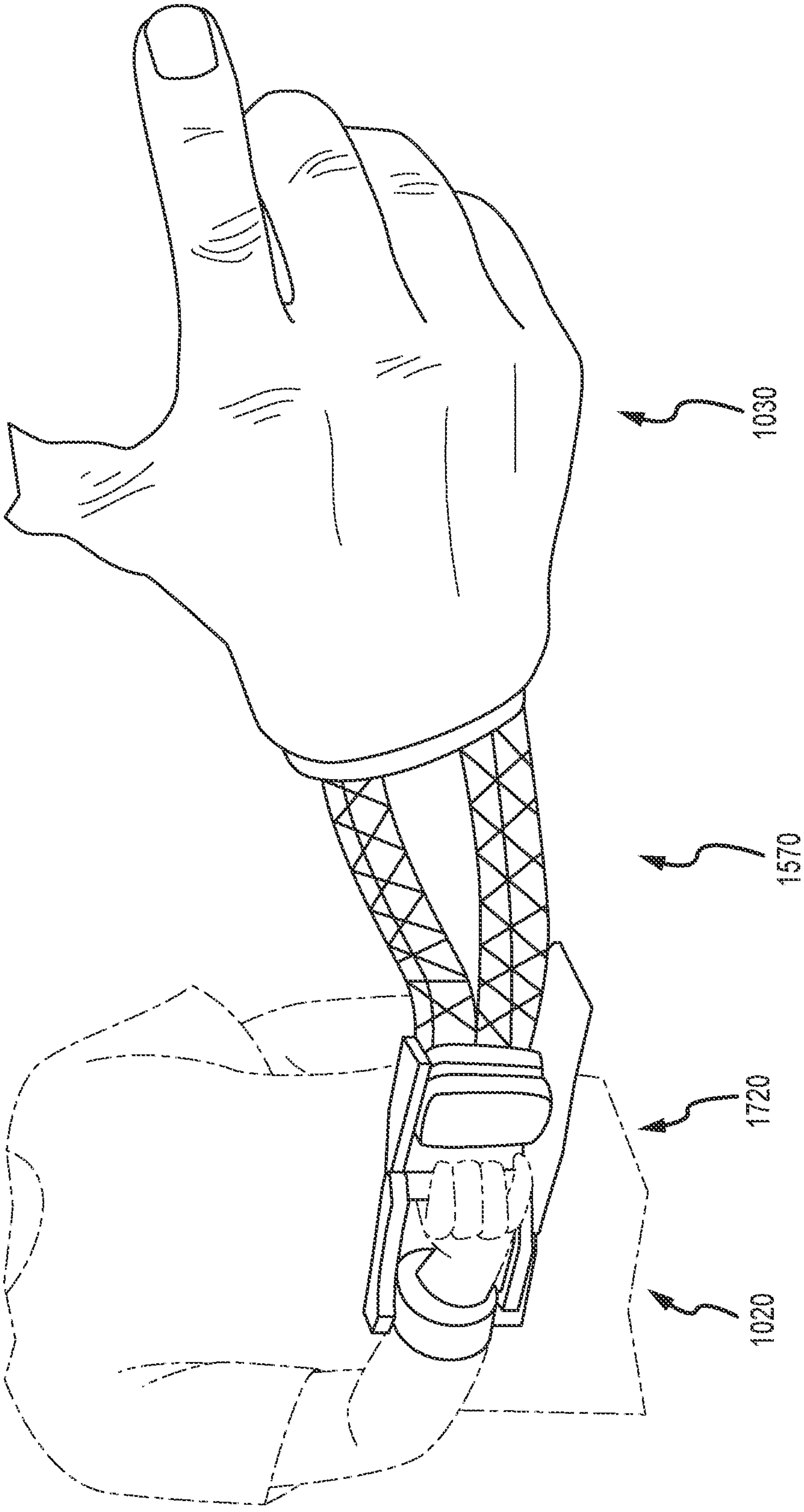
Figure 18:
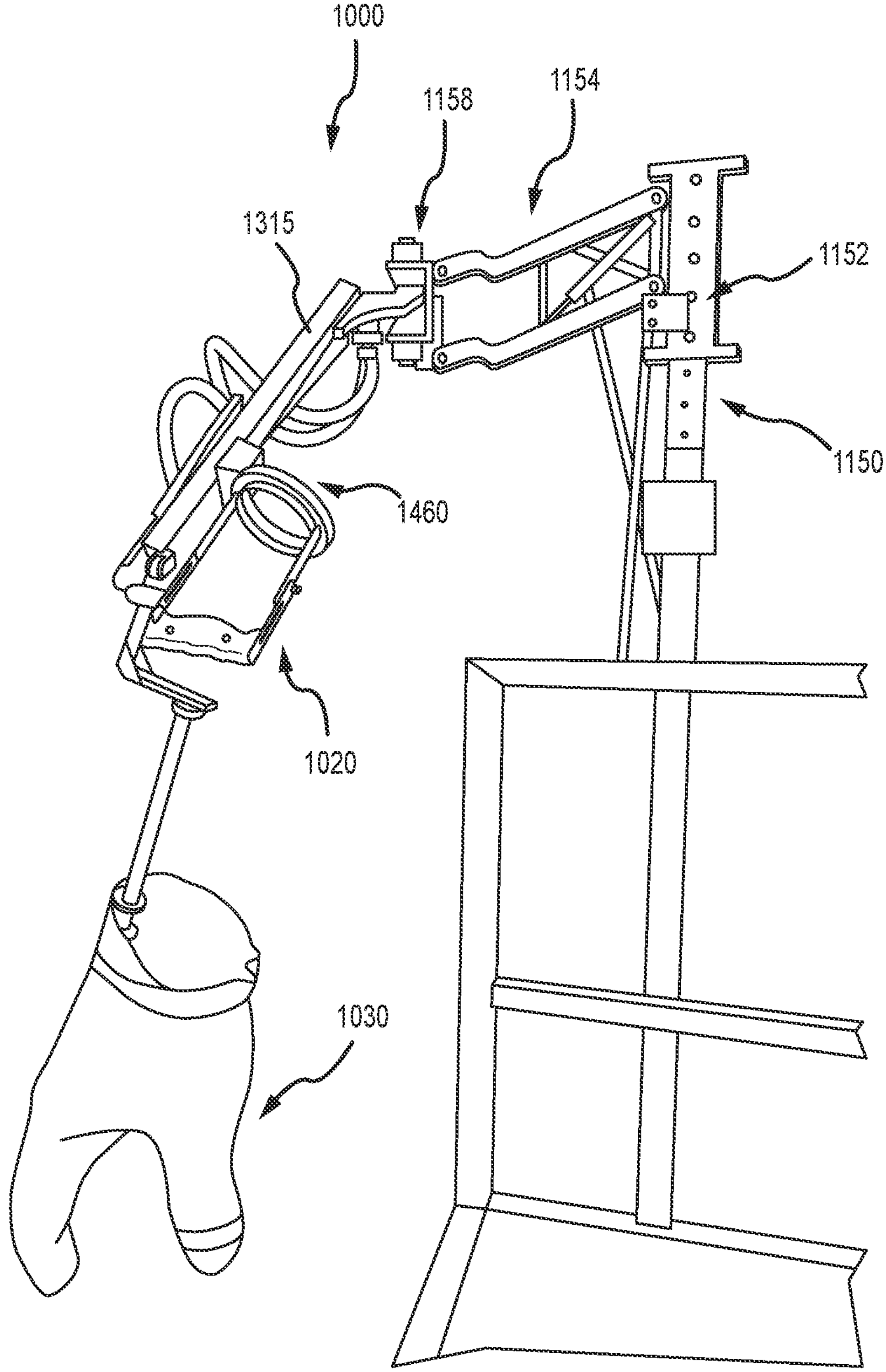

FIGS. 16A and 16B illustrate additional details of the hand drive mechanism 1020, with FIG. 16A showing the mechanism 1020 (and attached wrist and hand) in a first position or pose and FIG. 16B showing the mechanism 1020 in a second position or pose. The hand drive mechanism 1020 is configured to rotate the wrist, and this may be done in such a way to provide roll and pitch DOFs such as with cables as shown. FIG. 17 illustrates additional aspects of the exoskeleton of the arm rig 1000 including the figure manipulation assembly 1720 (shown flexing one finger while closing the others) operable to manipulate the fingers of the costume hand 1030. FIG. 18 shows the exoskeleton with the arm rig 1000 further exposed with the removal of the shell 1010. Here, in this test mode, the spine 1150 is shown attached to a support frame rather than to other portions of the exoskeleton (like the waist ring or belt).

Figure 19:
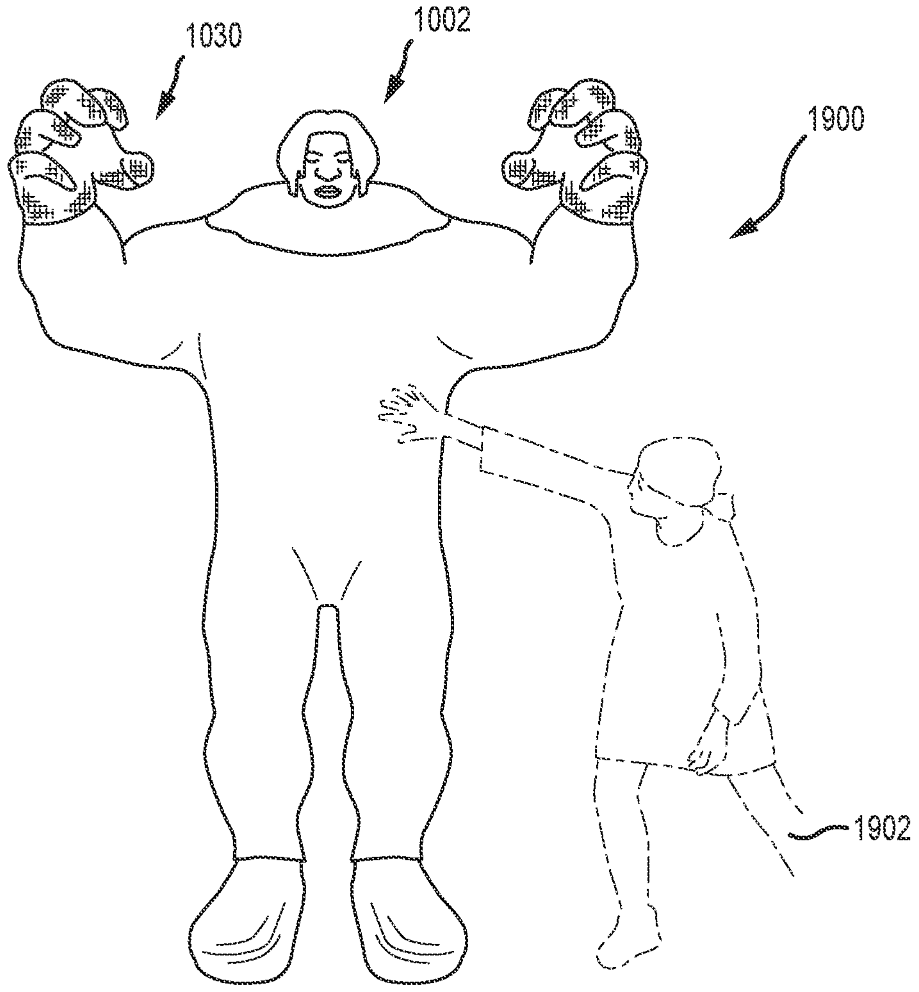
FIG. 19 illustrates a partial costume system, with the head and neck assist mechanism removed, showing the costume system with a skin/outer layer and shells applied over the exoskeleton of the present description.

FIG. 19 shows a partially completed costume 1900 (e.g., partial in that it is missing the neck physical assist mechanism and the head) being worn by a normal sized human performer 1002 standing next to a similarly sized human assistant 1902. The costume exoskeleton, hidden underneath the outer layer or skin 1980, transfers weight of the costume to the performer's torso, then downward through a leg structure to the ground so that the performer's vulnerable back and shoulder joints are not loaded with the weight of the costume 1900 (including hand 1030 and attached rig 1000 discussed above). The following figures and discussion provide further details of one exemplary exoskeleton as may be used with costume 1900.

Figure 20:
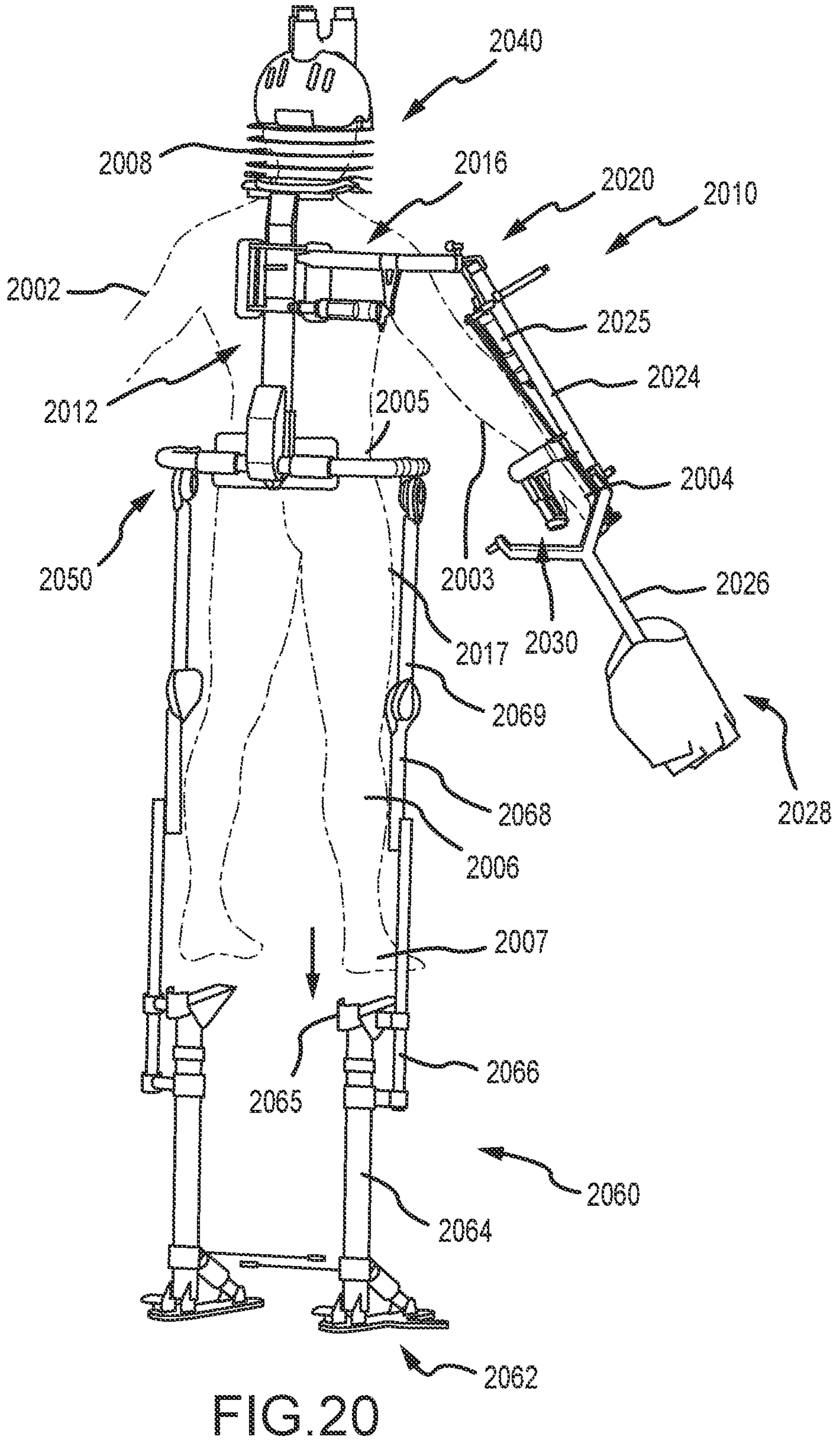
FIG. 20 illustrates an embodiment of an exoskeleton of the present description with a human performer wearing or positioned within the exoskeleton.
Figure 21:
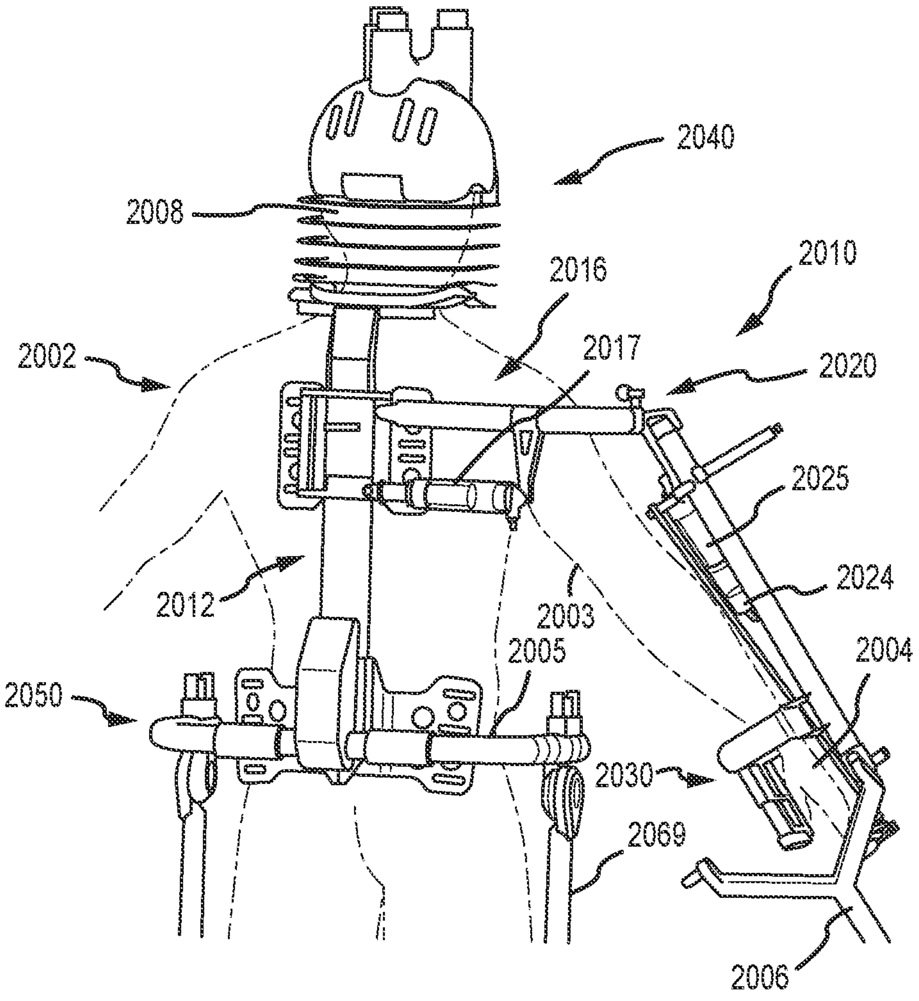
FIG. 21 is an enlarged view of the upper portion of the exoskeleton of FIG. 20 to show its components in greater detail.

FIG. 20 illustrates an embodiment of an exoskeleton 2010 of the present description with a human performer 2002 wearing or positioned within the exoskeleton 2010. FIG. 21 is an enlarged view of the upper portion of the exoskeleton 2010 of FIG. 20 showing its components in greater detail. As shown in these two figures, the exoskeleton 2010 includes a spine 2012 that extends vertically upward adjacent and spaced apart from the performer 2002 (e.g., parallel to their spine). A shoulder/clavicle member or assembly 2016 is provided that is pivotally coupled to the upper end of the spine 2012 and extends generally orthogonally outward near the shoulder of the performer 2002 to a shoulder joint 2020, and a passive physical or lift assist 2017 is provided to assist lifting and/or pivoting the member or assembly 2016 relative to the pivotal coupling with the spine 2012 (as discussed above with reference to FIG. 11).

Pivotally coupled to the shoulder joint 202 is an elongated arm member 2024, which is positioned parallel and spaced apart from the arm 2003 of the performer 2002. A passive assist mechanism 2025 is provided to assist the performer 2022 in lifting the arm member 2024, as well as the forearm member 2026 that extends outward from a lower portion of the arm member 2024 at an elbow joint and the manipulable hand 2028 at the end of the forearm 2026. A hand/wrist drive mechanism 2030 is provided on the arm member 2024, where it is slidably supported to account for differing sizes of performer 2002 and is operable by the performer 2002 with their hand 2004.

A neck physical assist mechanism 2040 is included in the exoskeleton 2010, and it is configured to provide passive (e.g., spring-based) assist to supporting and moving the costume head (not shown but would be positioned upon the mechanism 2040). The mechanism 2040 is attached or coupled to the upper end of the spine 2012 so that the weight of the mechanism 2040 and a later supported head would be transmitted away from the performer's neck 2008 and head (which are positioned in the mechanism 2040) to the ground.

To assist in the weight transfer, the exoskeleton 2010 includes a waist ring or belt 2050, and the spine 2012 is coupled rigidly at its lower end to a center portion of the waist ring or belt 2050 so as to receive the weight carried by the spine 2012. The exoskeleton 2010 is configured such that the waist ring or belt 2050, which is arcuate in shape, extends fully or partially (as shown) about the waist 2005 of the performer 2002 in a spaced-apart manner when the performer 2002 is wearing or positioned in the exoskeleton 2010.

To transfer the weight to the ground (i.e., any supporting surface), the exoskeleton 2010 includes a pair of leg (or torso-to-ground weight distribution) assemblies 2060. Each leg assembly 2060 is pivotally coupled to opposite ends (or sides) of the waist or belt ring 2050 via an upper leg member 2069, such that the weight received by the waist or belt ring 2050 is passed to the upper leg member 2069. An intermediate leg member 2068 is pivotally coupled at its upper end to the lower end of the upper leg member 2069, and a lower leg member 2066 is pivotally coupled at its upper end to the lower end of the intermediate leg member 2068, such that the weight of the exoskeleton 2010 and a musculature layer and outer layer/skin that would be applied over the exoskeleton 2010 is transferred to the lower leg member 2066. The lower leg member 2066 is rigidly coupled at its lower end to an upper end of a shin or ankle strut or member 2064, which includes a pad or platform 2065 for receiving or mating with the foot 2007 of the performer 2002. The shin or ankle strut or member 2064 is an elongated and rigid component that may be tubular to house a leg physical assist member that may take the form of a gas shock or spring. A foot assembly 2062 is provided at the lower end of the shin or ankle strut or member 2064, and this assembly 2062 receives the weight of the costume (including exoskeleton 2010) and transfers it to the ground/support surface.

Figure 22B:
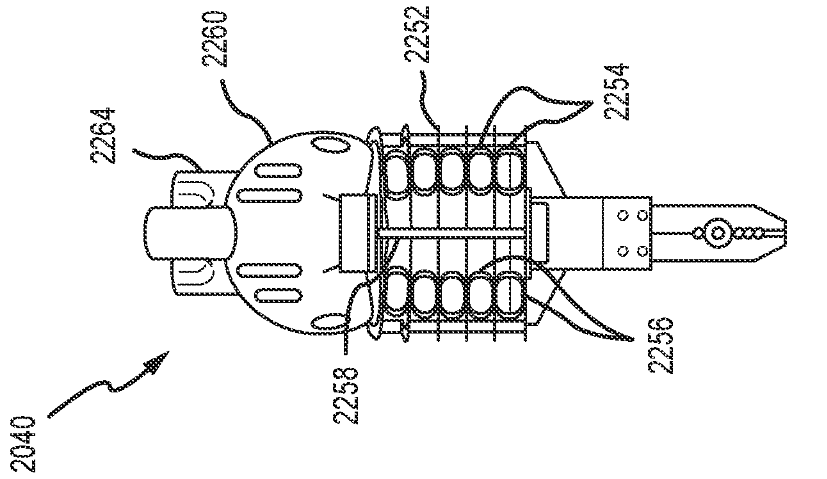
FIGS. 22A and 22B illustrate side and back views, respectively, of the neck physical assist mechanism of the exoskeleton of FIGS. 20 and 21 in greater detail.
Figure 22A:
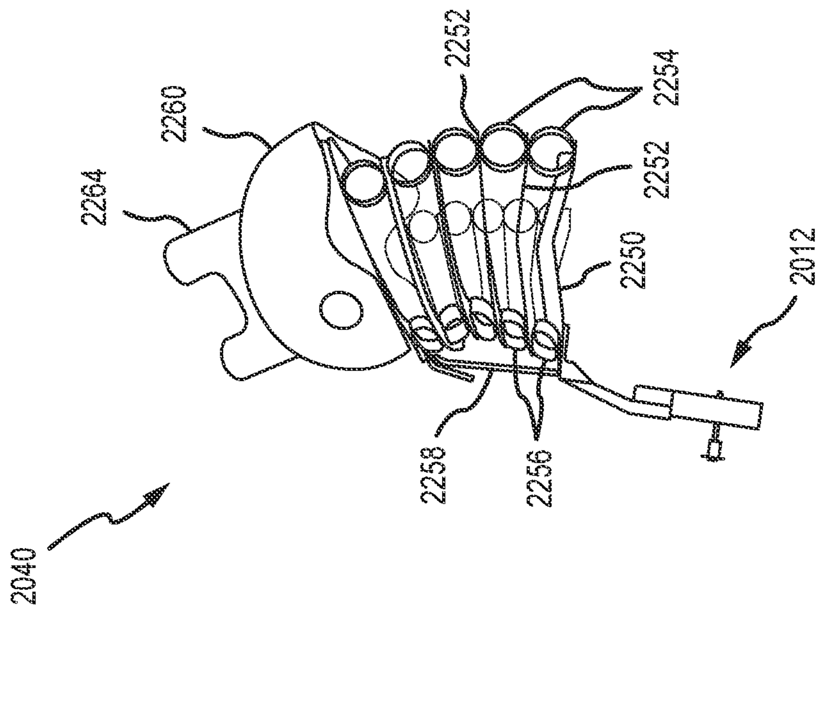

FIGS. 22A and 22B illustrate side and back views, respectively, of the neck physical assist mechanism 2040 of the exoskeleton 2010 of FIGS. 20 and 21 in greater detail. The assembly or mechanism 2040 is attached at a lower end to the spine 2012 via a base element or collar 2250, which is arcuate (e.g., U or C) shaped and sized to extend at least partially about the performer's neck (as shown in FIGS. 20 and 21). Extending upward from the collar 2250 are a plurality of neck support members 2252, which may also be arcuate in shape (such as U or C-shaped) and formed of a rigid or substantially rigid material such as a metal, a plastic, or the like. The neck support elements 2252 are configured also to extend about the performer's neck while being spaced apart from the performer's neck such that no weight is placed on the performer due to the costume head. The neck support elements 2252 are also spaced apart a distance (such as 0.5 to 2 inches) and arranged with the same orientation and to be parallel to each other as shown.

Passive assist is provided in part by the inclusion of elastic or spring members 2254 disposed between the collar 2250 and the lowest neck support element 2252 and between adjacent pairs of the elements 2252. Two or more spring members 2254 may be so disposed, and the members 2254 may take a variety of forms such as helical springs or circular or hoop-shaped bodies (as shown) formed of a resilient material that is compressible from an at rest position but that tends to move back into the at rest position or shape such as a rubber, a plastic, or the like. The neck physical assist mechanism 2040 further includes a helmet 2260 that may rest on or slightly above the performer's head to avoid placing weight on the performer, and a head mount assembly 2264 is provided on an upper outer surface of the helmet 2260. Additional passive assist may be provided as shown by the includes of an additional spring member(s) 2258, which may be coupled at a first or lower end to a rear portion of the collar 2250 at or proximate to the connection with the spine 2012 and a second or upper end to rear and lower portion of the helmet 2260.

Figure 23:
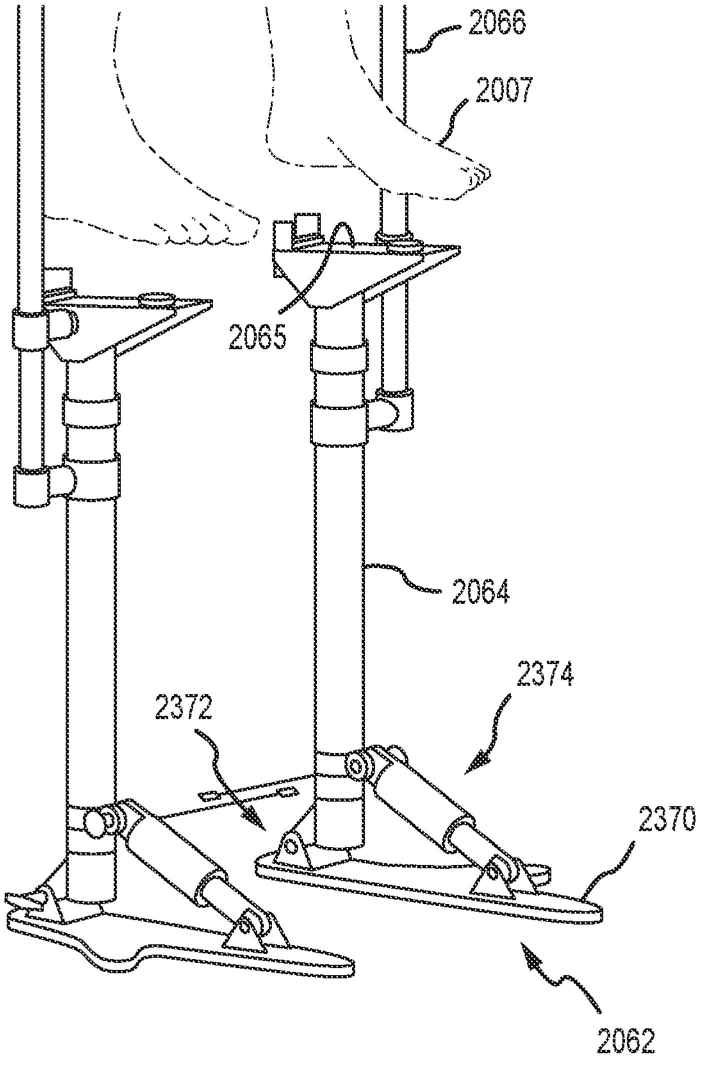
FIG. 23 illustrates an enlarged view of the lower portion of the exoskeleton of FIG. 20 in greater detail.

FIG. 23 illustrates an enlarged view of the lower portion of the exoskeleton of FIG. 20 in greater detail. As shown, the shin or ankle strut 2064 is pivotally coupled via an ankle joint 2372 in the foot assembly 2062 at a rear portion of a foot base or platform 2370. A passive assist mechanism 2374 may be provided as shown to provide physical assistance in achieving a walking motion, and the mechanism 2374 may take the form of a pneumatic piston or strut, a gas spring, or the like that is pivotally coupled to a lower portion of the shin or ankle strut or member 2064 and at an opposite end to an upper surface at a forward location on the foot base or platform 2370 (as shown in FIG. 23).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. An exoskeleton for a character suit, comprising:
- a scapula joint;
- a shoulder joint;
- an elbow joint coupled to the shoulder joint by an upper arm linkage;
- a passive, pneumatic assist coupled to the scapula joint and the shoulder joint;
- a linkage mechanism that ties elbow and scapula movement to shoulder rotation;
- a sliding performer attachment mechanism that allows for dynamic shifting of geometry relations between a performer and the character suit;
- a flexible shaft that allows the performer's wrist to directly rotate a wrist of the character suit; and
- a cable-driven mechanism for finger articulation and wrist curl.

2. An exoskeleton for use in a large character costume to support and move an outer skin layer, comprising:
- a spine;
- a waist ring configured to extend about a waist of a performer using the exoskeleton in a spaced apart manner, wherein a lower end of the spine is attached to the waist ring;
- a pair of leg assemblies each pivotally coupled on opposite sides of the waist ring, wherein each of the leg assemblies is configured to be spaced apart from a leg of the performer and wherein each of the leg assemblies is configured to extend below a foot of the performer, whereby weight of the outer skin layer and the exoskeleton are transmitted to a support surface under the leg assemblies;
- a neck physical assist mechanism including a collar that is arcuate in shape, configured to extend at least partially about a neck of the performer, and attached to an upper end of the spine;
- a shoulder assembly pivotally coupled to the upper end of the spine;
- an arm member pivotally coupled via a shoulder joint to the shoulder assembly;
- a manipulable hand coupled to the arm member at an end opposite the shoulder joint; and
- a hand drive mechanism operable by the performer's hand to rotate the hand relative to the arm member or to move one or more fingers of the manipulable hand.

3. The exoskeleton of claim 2, wherein the neck physical assist mechanism further comprises a mounting element for receiving and attaching to a head of the large character costume and a passive assist assembly disposed between the mounting element and the collar that is configured to assist the performer in moving the head relative to the upper end of the spine.

4. The exoskeleton of claim 2, wherein the hand drive mechanism is slidably supported on the arm member to allow a location of the hand drive mechanism in the exoskeleton to be linearly adjusted relative to the arm member to account for a size of the performer.

5. The exoskeleton of claim 2, wherein each of the leg assemblies includes at least one passive assist mechanism configured to assist the performer in moving the exoskeleton with bipedal locomotion.

6. An exoskeleton for use in a large character costume, comprising:
- a spine;

a waist ring arcuate in shape configured to extend about a waist of a performer using the exoskeleton in a spaced apart manner, wherein a lower end of the spine is attached to a rear center portion of the waist ring;

a shoulder assembly pivotally coupled to an upper end of the spine;

a shoulder passive assist mechanism configured for assisting in pivoting the shoulder assembly relative to the upper end of the spine; and a neck physical assist mechanism including a collar that is arcuate in shape, configured to extend at least partially about a neck of the performer, and attached to the upper end of the spine.

7. The exoskeleton of claim 6, wherein the neck physical assist mechanism further comprises a mounting element for receiving and attaching to a head of the large character costume.

8. The exoskeleton of claim 7, wherein the neck physical assist mechanism further comprises a passive assist assembly disposed between the mounting element and the collar that is configured to assist the performer in moving the head relative to the upper end of the spine.

9. The exoskeleton of claim 8, wherein the passive assist assembly comprises a plurality of spaced-apart, arcuate-shaped neck support elements and two or more spring members disposed between adjacent pairs of the neck support elements and between the collar and a lower one of the neck support elements.

10. The exoskeleton of claim 6, further comprising an arm member pivotally coupled via a shoulder joint to a portion of the shoulder assembly distal to the spine and a passive lift assist mechanism configured for assisting the performer in lifting the arm member about the shoulder joint.

11. The exoskeleton of claim 10, further comprising a manipulable hand coupled to the arm member at an end opposite the shoulder joint and a hand drive mechanism operable by the performer's hand to rotate the manipulable hand relative to the arm member or to move one or more fingers of the manipulable hand.

12. The exoskeleton of claim 11, wherein the hand drive mechanism is slidably supported on the arm member to allow a location of the hand drive mechanism in the exoskeleton to be linearly adjusted relative to the arm member to account for a size of the performer.

13. The exoskeleton of claim 6, further comprising a pair of leg assemblies each pivotally coupled on opposite sides of the waist ring, wherein each of the leg assemblies is configured to be spaced apart from a leg of the performer, wherein each of the leg assemblies is configured to extend below a foot of the performer, whereby weight of an outer skin layer and the exoskeleton are transmitted to a support surface under the leg assemblies, and wherein each of the leg assemblies includes at least one passive assist mechanism configured to assist the performer in moving the exoskeleton with bipedal locomotion.

* * * * *